US007653008B2

(12) United States Patent
Patrick et al.

(10) Patent No.: US 7,653,008 B2
(45) Date of Patent: *Jan. 26, 2010

(54) DYNAMICALLY CONFIGURABLE SERVICE ORIENTED ARCHITECTURE

(75) Inventors: Paul B. Patrick, Manchester, NH (US); Ashok Aletty, Saratoga, CA (US); Jayaram Kasi, San Jose, CA (US); Chet Kapoor, San Jose, CA (US); Tolga Urhan, Palo Alto, CA (US); Matthew Mihic, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 571 days.

This patent is subject to a terminal disclaimer.

(21) Appl. No.: 11/221,261

(22) Filed: Sep. 7, 2005

(65) Prior Publication Data

US 2006/0034237 A1    Feb. 16, 2006

Related U.S. Application Data

(63) Continuation-in-part of application No. 11/132,952, filed on May 19, 2005.

(60) Provisional application No. 60/573,354, filed on May 21, 2005, provisional application No. 60/573,717, filed on May 21, 2005.

(51) Int. Cl.
   *H04L 12/26*   (2006.01)
(52) U.S. Cl. ........................................ 370/254; 709/220
(58) Field of Classification Search ........................ None
   See application file for complete search history.

(56) References Cited

U.S. PATENT DOCUMENTS 3,790,939 A    2/1974  Constant

| 5,513,339 A | 4/1996 | Agrawal et al. |
| 5,546,549 A | 8/1996 | Barrett et al. |
| 5,628,016 A | 5/1997 | Kukol |
| 5,701,305 A | 12/1997 | Albrecht |
| 5,784,613 A | 7/1998 | Tamirisa |
| 5,805,914 A | 9/1998 | Wise et al. |
| 5,828,832 A | 10/1998 | Holden et al. .......... 395/187.01 |
| 5,835,087 A | 11/1998 | Herz et al. |
| 5,931,917 A | 8/1999 | Nguyen et al. |
| 5,974,568 A | 10/1999 | McQueen |
| 6,018,805 A | 1/2000 | Ma et al. |
| 6,029,195 A | 2/2000 | Herz |
| 6,065,055 A | 5/2000 | Hughes et al. |

(Continued)

OTHER PUBLICATIONS

"<rethrow>", cafe.bevocal.com definition, retrieved from <http://www.archive.org/web/20030405195631/cafe.bevocal.com/docs/vxml/rethrow.html>, Apr. 5, 2003, 2 pages.
Andera, "When is a Throw not a Rethrow?", Craig Andera's Weblog, <http://www.pluralsight.com/blogs/craig/archive/2003/08/04/900.aspx>, Aug. 4, 2003, 7 pages.

*Primary Examiner*—Phirin Sam
(74) *Attorney, Agent, or Firm*—Fliesler Meyer LLP

(57)    ABSTRACT

A system, method and media for a service oriented architecture, including in one embodiment, a method for configuring a service proxy, comprising configuring a transformation between a reception protocol and a transmission protocol, configuring a potential message processing path capable of processing a message that has been received with the reception protocol, providing the message for transmission to the transmission protocol, wherein the potential message processing path includes a message processing node capable of processing the message, and wherein the message processing node implements an interface and/or a protocol that is compatible with the service proxy. Other features, aspects and objects of the invention can be obtained from a review of the specification, the figures and the claims.

17 Claims, 16 Drawing Sheets

U.S. PATENT DOCUMENTS

| | | | |
|---|---|---|---|
| 6,134,680 A | 10/2000 | Yeomans | |
| 6,167,446 A * | 12/2000 | Lister et al. | 709/223 |
| 6,185,208 B1 * | 2/2001 | Liao | 370/392 |
| 6,195,676 B1 | 2/2001 | Spix et al. | |
| 6,209,018 B1 | 3/2001 | Ben-Shachar et al. | |
| 6,212,640 B1 | 4/2001 | Abdelnur et al. | |
| 6,226,677 B1 | 5/2001 | Slemmer | |
| 6,226,752 B1 | 5/2001 | Gupta et al. | |
| 6,259,706 B1 * | 7/2001 | Shimada | 370/466 |
| 6,314,512 B1 | 11/2001 | Branson et al. | |
| 6,374,144 B1 | 4/2002 | Viviani et al. | |
| 6,415,246 B1 | 7/2002 | Snyder | |
| 6,463,142 B1 | 10/2002 | Kilp | |
| 6,516,411 B2 | 2/2003 | Smith | |
| 6,542,841 B1 | 4/2003 | Snyder | |
| 6,618,817 B1 | 9/2003 | Armstrong | |
| 6,622,260 B1 | 9/2003 | Marisetty et al. | |
| 6,640,240 B1 | 10/2003 | Hoffman et al. | |
| 6,665,262 B1 | 12/2003 | Lindskog et al. | |
| 6,671,728 B1 | 12/2003 | Mayberry | |
| 6,681,220 B1 | 1/2004 | Kaplan et al. | |
| 6,718,376 B1 | 4/2004 | Chu et al. | |
| 6,868,441 B2 | 3/2005 | Greene et al. | |
| 6,894,979 B1 * | 5/2005 | Lee | 370/241 |
| 6,918,058 B2 | 7/2005 | Miura et al. | |
| 6,918,059 B1 | 7/2005 | Galuten et al. | |
| 6,947,984 B2 | 9/2005 | Schweitzer et al. | |
| 6,950,845 B2 | 9/2005 | Givoly | |
| 6,954,220 B1 | 10/2005 | Bowman-Amuah | |
| 6,993,683 B2 | 1/2006 | Bhat et al. | |
| 7,017,175 B2 | 3/2006 | Alao et al. | |
| 7,024,580 B2 * | 4/2006 | Guimbellot et al. | 714/1 |
| 7,035,202 B2 | 4/2006 | Callon | |
| 7,086,066 B2 | 8/2006 | Kappel et al. | |
| 7,092,928 B1 | 8/2006 | Elad et al. | |
| 7,117,504 B2 | 10/2006 | Smith et al. | |
| 7,146,544 B2 | 12/2006 | Hsu et al. | |
| 7,155,515 B1 | 12/2006 | Brown | |
| 7,165,097 B1 | 1/2007 | Mackin et al. | |
| 7,168,014 B2 | 1/2007 | Ghosh et al. | |
| 7,171,672 B2 | 1/2007 | Just | |
| 7,180,866 B1 | 2/2007 | Chartre et al. | |
| 7,181,490 B1 * | 2/2007 | Harvey et al. | 709/203 |
| 7,181,684 B2 | 2/2007 | Chittu et al. | |
| 7,185,060 B2 | 2/2007 | Christensen et al. | |
| 7,191,381 B2 | 3/2007 | Gesbert | |
| 7,206,974 B2 | 4/2007 | Kozlov et al. | |
| 7,209,916 B1 | 4/2007 | Seshadri et al. | |
| 7,236,546 B2 | 6/2007 | Egnor et al. | |
| 7,242,925 B2 | 7/2007 | O'Neil et al. | |
| 7,243,267 B2 | 7/2007 | Klemm et al. | |
| 7,246,263 B2 | 7/2007 | Skingle | |
| 7,254,833 B1 | 8/2007 | Cornelius | |
| 7,269,665 B2 | 9/2007 | Pauly et al. | |
| 7,289,964 B1 | 10/2007 | Bowman-Amuah | |
| 7,336,663 B2 * | 2/2008 | Sakai | 370/395.3 |
| 7,346,649 B1 | 3/2008 | Wong | |
| 7,373,563 B2 | 5/2008 | Noy et al. | |
| 7,380,166 B2 | 5/2008 | Thatte et al. | |
| 7,389,330 B2 | 6/2008 | Dillon | |
| 7,395,335 B2 | 7/2008 | Brown | |
| 7,406,030 B1 | 7/2008 | Rijsman | |
| 7,434,109 B1 | 10/2008 | Stabile | |
| 7,444,674 B1 | 10/2008 | Etique | |
| 7,444,679 B2 | 10/2008 | Tarquini | |
| 7,451,217 B2 | 11/2008 | Wardrop | |
| 7,458,082 B1 | 11/2008 | Slaughter | |
| 2001/0010053 A1 | 7/2001 | Ben-Shachar et al. | |
| 2002/0031230 A1 | 3/2002 | Sweet et al. | |
| 2002/0036982 A1 * | 3/2002 | Chen | 370/230 |
| 2002/0073180 A1 | 6/2002 | Dewhurst et al. | |
| 2002/0099818 A1 | 7/2002 | Russell et al. | |
| 2002/0120711 A1 | 8/2002 | Bantz et al. | |
| 2002/0120723 A1 | 8/2002 | Forth et al. | |
| 2002/0160745 A1 | 10/2002 | Wang | |
| 2002/0186128 A1 | 12/2002 | Amano et al. | |
| 2003/0018732 A1 | 1/2003 | Jacobs et al. | |
| 2003/0025599 A1 | 2/2003 | Monroe | |
| 2003/0033346 A1 | 2/2003 | Carlson et al. | |
| 2003/0033351 A1 | 2/2003 | Ricciardi | |
| 2003/0051190 A1 | 3/2003 | Marisetty et al. | |
| 2003/0065726 A1 | 4/2003 | Wells et al. | |
| 2003/0074413 A1 * | 4/2003 | Nielsen et al. | 709/206 |
| 2003/0093479 A1 | 5/2003 | Mellen-Garnett et al. | |
| 2003/0093500 A1 | 5/2003 | Khodabakchian et al. | |
| 2003/0101251 A1 | 5/2003 | Low | |
| 2003/0115370 A1 | 6/2003 | Jacquin et al. | |
| 2003/0135556 A1 | 7/2003 | Holdsworth | |
| 2003/0142680 A1 | 7/2003 | Oguchi | |
| 2003/0163544 A1 | 8/2003 | Wookey | |
| 2003/0163646 A1 | 8/2003 | O'Neil | |
| 2003/0167296 A1 | 9/2003 | Todd | |
| 2003/0172145 A1 | 9/2003 | Nguyen | |
| 2003/0212999 A1 * | 11/2003 | Cai | 725/119 |
| 2004/0001514 A1 | 1/2004 | Wookey et al. | |
| 2004/0019465 A1 | 1/2004 | Kerr et al. | |
| 2004/0019835 A1 | 1/2004 | Marisetty et al. | |
| 2004/0073782 A1 | 4/2004 | Price et al. | |
| 2004/0081178 A1 | 4/2004 | Fujimori | |
| 2004/0093381 A1 | 5/2004 | Hodges et al. | |
| 2004/0095833 A1 | 5/2004 | Marisetty et al. | |
| 2004/0117435 A1 | 6/2004 | Rossmanith et al. | |
| 2004/0143625 A1 | 7/2004 | Sheinis et al. | |
| 2004/0162741 A1 | 8/2004 | Flaxer et al. | |
| 2004/0168184 A1 | 8/2004 | Steenkamp et al. | |
| 2004/0218609 A1 * | 11/2004 | Foster et al. | 370/401 |
| 2005/0015462 A1 | 1/2005 | Lee et al. | |
| 2005/0015773 A1 | 1/2005 | Gorman et al. | |
| 2005/0021751 A1 | 1/2005 | Block et al. | |
| 2005/0021772 A1 | 1/2005 | Shedrinsky | |
| 2005/0050548 A1 | 3/2005 | Sheinis et al. | |
| 2005/0080914 A1 | 4/2005 | Lerner et al. | |
| 2005/0080930 A1 | 4/2005 | Joseph | |
| 2005/0086360 A1 | 4/2005 | Mamou et al. | |
| 2005/0108246 A1 | 5/2005 | Dillon | |
| 2005/0120106 A1 | 6/2005 | Albertao | |
| 2005/0135387 A1 * | 6/2005 | Rychener et al. | 370/401 |
| 2005/0160161 A1 | 7/2005 | Barrett | |
| 2005/0160434 A1 | 7/2005 | Tan et al. | |
| 2005/0177616 A1 | 8/2005 | Addington et al. | |
| 2005/0188079 A1 | 8/2005 | Motsinger et al. | |
| 2005/0198335 A1 | 9/2005 | Brown | |
| 2005/0204214 A1 | 9/2005 | Welch | |
| 2005/0228863 A1 | 10/2005 | Palmeri et al. | |
| 2005/0273521 A1 * | 12/2005 | Patrick et al. | 709/246 |
| 2005/0278335 A1 | 12/2005 | Patrick et al. | |
| 2006/0069717 A1 | 3/2006 | Mamou et al. | |
| 2006/0095815 A1 | 5/2006 | Noy et al. | |
| 2006/0155851 A1 * | 7/2006 | Ma et al. | 709/226 |
| 2007/0005777 A1 | 1/2007 | Fremantle et al. | |
| 2007/0106761 A1 | 5/2007 | Beoughter et al. | |
| 2007/0297394 A1 | 12/2007 | Allan | |
| 2008/0016559 A1 | 1/2008 | Cornelius | |
| 2008/0183812 A1 | 7/2008 | Paul | |

* cited by examiner

DYNAMICALLY CONFIGURABLE SERVICE ORIENTED ARCHITECTURE

CLAIM OF PRIORITY

This application claims priority from the following co-pending applications, which are hereby incorporated in their entirety:

This application is a Continuation in part of U.S. patent application Ser. No. 11/132,952 entitled DYNAMICALLY CONFIGURABLE SERVICE ORIENTED ARCHITECTURE, by Matthew Mihic et al., filed May 19, 2005, which claims the benefit of U.S. Provisional Application No. 60/573,354 entitled SYSTEM AND METHOD FOR ENTERPRISE APPLICATION INTEGRATION BUS, by Matthew Mihic et al., filed May 21, 2004.

CROSS-REFERENCE TO RELATED APPLICATIONS

This application is related to the following co-pending applications, each of which are incorporated herein by reference:

U.S. patent application Ser. No. 11/132,986 entitled LIQUID COMPUTING, by Alfred Chang et al., filed May 19, 2005, which claims the benefit of U.S. Provisional Application No. 60/573,717 entitled LIQUID COMPUTING, by Alfred Chang et al., filed May 21, 2004.

U.S. patent application Ser. No. 11/133,037 entitled SERVICE ORIENTED ARCHITECTURE WITH MESSAGE PROCESSING STAGES, by Paul B. Patrick et al., filed May 19, 2005

U.S. patent application Ser. No. 11/132,558 entitled SERVICE ORIENTED ARCHITECTURE WITH MESSAGE PROCESSING PIPELINES, by Paul B. Patrick et al., filed May 19, 2005

U.S. patent application Ser. No. 11/133,022 entitled SERVICE ORIENTED ARCHITECTURE, by Paul B. Patrick et al., filed May 19, 2005

U.S. patent application Ser. No. 11/132,566 entitled FAIL-SAFE SERVICE ORIENTED ARCHITECTURE, by Paul B. Patrick et al., filed May 19, 2005

U.S. patent application Ser. No. 11/132,575 entitled SCALEABLE SERVICE ORIENTED ARCHITECTURE, by Paul B. Patrick et al., filed May 19, 2005

U.S. patent application Ser. No. 11/132,952 entitled DYNAMICALLY CONFIGURABLE SERVICE ORIENTED ARCHITECTURE, by Paul B. Patrick et al., filed May 19, 2005

U.S. patent application Ser. No. 11/133,111 entitled SECURE SERVICE ORIENTED ARCHITECTURE, by Paul B. Patrick et al., filed May 19, 2005

U.S. patent application Ser. No. 11/133,109 entitled CO-LOCATED SERVICE ORIENTED ARCHITECTURE, by Paul B. Patrick et al., filed May 19, 2005

U.S. patent application Ser. No. 11/133,406 entitled PROGRAMMABLE SERVICE ORIENTED ARCHITECTURE, by Paul B. Patrick et al., filed May 19, 2005

U.S. patent application Ser. No. 11/133,020 entitled BATCH UPDATING FOR A SERVICE ORIENTED ARCHITECTURE, by Paul B. Patrick et al., filed May 19, 2005

U.S. patent application Ser. No. 11/132,557 entitled RELIABLE UPDATING FOR A SERVICE ORIENTED ARCHITECTURE, by Paul B. Patrick et al., filed May 19, 2005

U.S. patent application Ser. No. 11/132,571 entitled SERVICE ORIENTED ARCHITECTURE WITH FILE TRANSPORT PROTOCOL, by Paul B. Patrick et al., filed May 19, 2005

U.S. patent application Ser. No. 11/133,110 entitled SERVICE ORIENTED ARCHITECTURE WITH ELECTRONIC MAIL TRANSPORT PROTOCOL, by Paul B. Patrick et al., filed May 19, 2005

U.S. patent application Ser. No. 11/133,117 entitled DYNAMICALLY CONFIGURABLE SERVICE ORIENTED ARCHITECTURE, by Paul B. Patrick et al., filed May 19, 2005

U.S. patent application Ser. No. 11/131,566 entitled PROGRAMMABLE MESSAGE PROCESSING STAGE FOR A SERVICE ORIENTED ARCHITECTURE, by Paul B. Patrick et al., filed May 19, 2005

U.S. patent application Ser. No. 11/131,839 entitled SERVICE PROXY DEFINITION, by Paul B. Patrick et al., filed May 19, 2005

U.S. patent application Ser. No. 11/131,516 entitled DYNAMIC ROUTING IN A SERVICE ORIENTED ARCHITECTURE RULES, by Paul B. Patrick et al., filed May 19, 2005

U.S. patent application Ser. No. 11/131,622 entitled DYNAMIC PUBLISHING IN A SERVICE ORIENTED ARCHITECTURE, by Paul B. Patrick et al., filed May 18, 2005

U.S. patent application Ser. No. 11/131,794 entitled SERVICE ORIENTED ARCHITECTURE WITH MONITORING RULES, by Paul B. Patrick et al., filed May 18, 2005

U.S. patent application Ser. No. 11/131,838 entitled SERVICE ORIENTED ARCHITECTURE WITH INTERCHANGEABLE TRANSPORT PROTOCOLS, by Paul B. Patrick et al., filed May 18, 2005

U.S. patent application Ser. No. 11/132,134 entitled SERVICE ORIENTED ARCHITECTURE WITH ALERTS RULES, by Paul B. Patrick et al., filed May 18, 2005

U.S. patent application Ser. No. 11/131,833 entitled SERVICE ORIENTED ARCHETECTURE WITH CREDENTIAL MANAGEMENT, by Paul B. Patrick et al., filed May 18, 2005

U.S. patent application Ser. No. 11/131,841 entitled SERVICE ORIENTED ARCHETECTURE WITH MESSAGE PROCESSING PIPELINES, by Paul B. Patrick et al., filed May 18, 2005

U.S. patent application Ser. No. 11/131,719 entitled ERROR HANDLING FOR A SERVICE ORIENTED ARCHITECTURE, by Paul B. Patrick et al., filed May 18, 2005

U.S. patent application Ser. No. 11/132,139 entitled DYNAMIC PROGRAM MODIFICATION, by Paul B. Patrick et al., filed May 18, 2005

U.S. patent application Ser. No. 11/131,840 entitled DYNAMIC PROGRAM MODIFICATION, by Paul B. Patrick et al., filed May 18, 2005

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates generally to middleware for services and, more particularly, to a switching fabric having message processing capabilities through which clients and services can communicate.

BACKGROUND

The need for enterprise software applications to work together with web browser-based front ends lead to the development of application servers. Application servers provide a framework for integrating front-end web applications with back-end enterprise applications. Beyond simply invoking enterprise applications from applications servers, a need arose to compose pieces of different enterprise applications into composite applications. One way this can be done is to expose an enterprise application as a set of reusable services that other systems can access. However, enterprise applications are typically deployed in multiple application platforms and heterogeneous environments. These factors make the composition effort proprietary and programming-driven, resulting in brittle and expensive integrations. What is needed is an flexible infrastructure to dynamically compose services and handle any incompatibilities that might arise between them.

SUMMARY

Disclosed herein is a system, method and media for a service oriented architecture. This description is not intended to be a complete description of, or limit the scope of, the invention. Other features, aspects and objects of the invention can be obtained from a review of the specification, the figures and the claims.

DETAILED DESCRIPTION

The invention is illustrated by way of example and not by way of limitation in the figures of the accompanying drawings in which like references indicate similar items. References to embodiments in this disclosure are not necessarily to the same embodiment, and such references mean at least one. While specific implementations are discussed, it is understood that this is done for illustrative purposes. A person skilled in the relevant art can recognize that other components and configurations may be used without departing from the scope and spirit of the invention.

In the following description, numerous specific details are set forth to provide a thorough description of the invention. However, it can be apparent to one skilled in the art that the invention may be practiced without these specific details. In other instances, well-known features have not been described in detail so as not to obscure the invention.

Figure 1A:
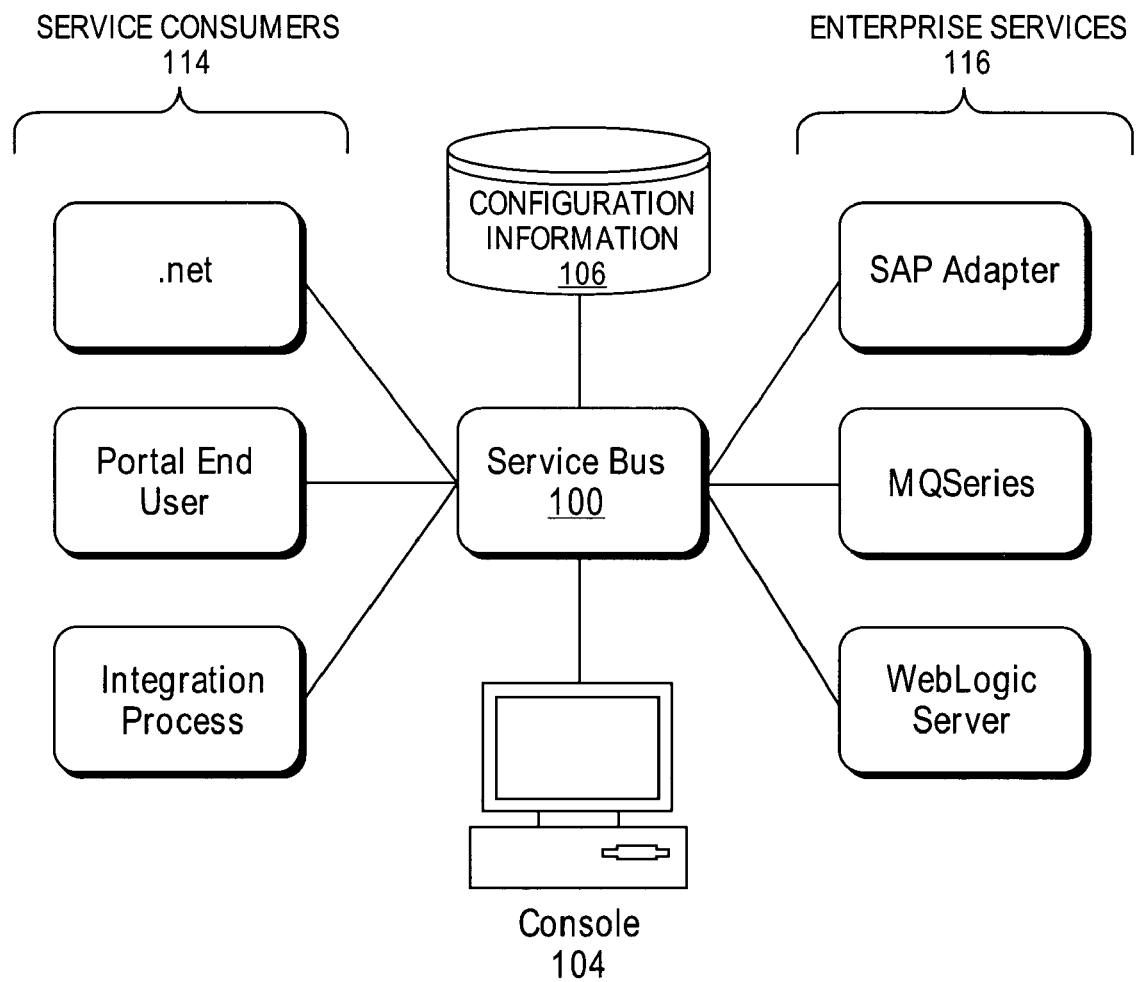
FIG. 1a is an illustration of a system in an embodiment.

With reference to FIG. 1a and by way of illustration, the system includes a service bus 100 that represents a fusion of message brokering, web services, business-to-business (B2B) services gateway and services management concepts into a combination centered around a runtime configuration information directory/repository 106 and console 104. The service bus is an easy to use configuration-driven intermediary that accomplishes (without limitation) the following efficiently and with high availability, scalability and reliability:

- Bridges the gap between what the message the sender 114 sends and what the receiver 116 expects in the area of envelope protocol, transport protocol, security scheme, payload contents, one way and request/response paradigms, synchronous and asynchronous communication, point-to-point, and publish/subscribe.
- Provides additional computing capability to perform tasks such as (but not limited to) multi-destination publish, content based routing, authentication and authorization, and credential exchange.
- Provides monitoring capability with metrics collection and display, alert displays, tracking event collection and use, message archiving and Service Level Agreement (SLA) management.

Figure 1B:
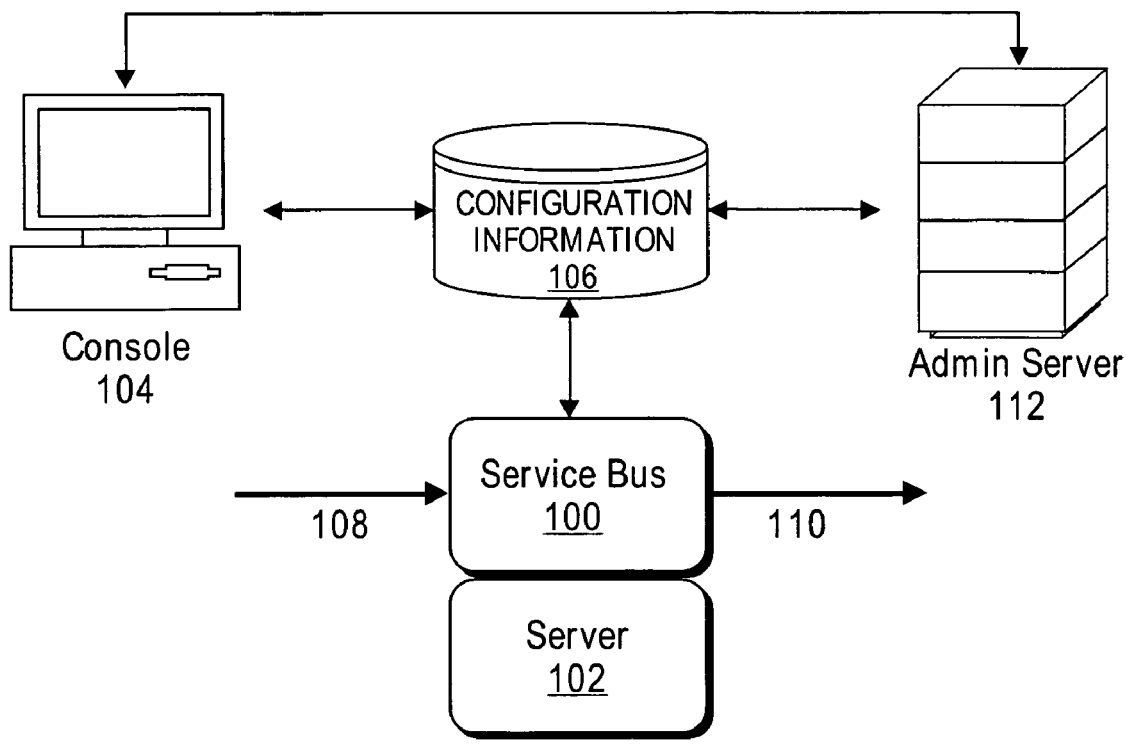
FIG. 1b is an illustration of a service bus architecture in accordance with an embodiment.

FIG. 1b is an illustration of a system in accordance with an embodiment. In one embodiment, the system includes a service bus 100 which can act as an intermediary between a client and a service. Those of skill in the art will appreciate that the present disclosure is not limited to or dependent upon any particular type of service or service technology. Many service types/technologies, including those that are known and those that are yet to be developed, are fully within the scope and spirit of the present disclosure. Messages to the service bus arrive on a transport 108 and can be processed to determine, by way of a example, a destination to route and/or publish the message to, a transformation to perform on the message, and/or security processing. The message then is sent out on transport 110 bound for a service or another service bus. In one embodiment, a response to the message can follow an inverse path through the service bus.

In one embodiment, the service bus can be implemented partially or wholly on an application server 102 such as WebLogic® Server, available from BEA Systems, Inc. The system is driven by configuration information 106 which can specified through the configuration/monitoring console 104 which provides a user interface for creating, modifying and deleting configuration information. All aspects of the system are dynamically configurable. By way of a non-limiting example, a user interface can include one or more of the following: 1) a graphical user interface (GUI) rendered on a display device or projected onto a user's retina; 2) an ability to respond to sounds and/or voice commands; 3) an ability to respond to input from a remote control device (e.g., a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular user interface. Those of skill in the art can recognize that many other user interfaces are possible and fully within the scope and spirit of this disclosure.

Figure 2:
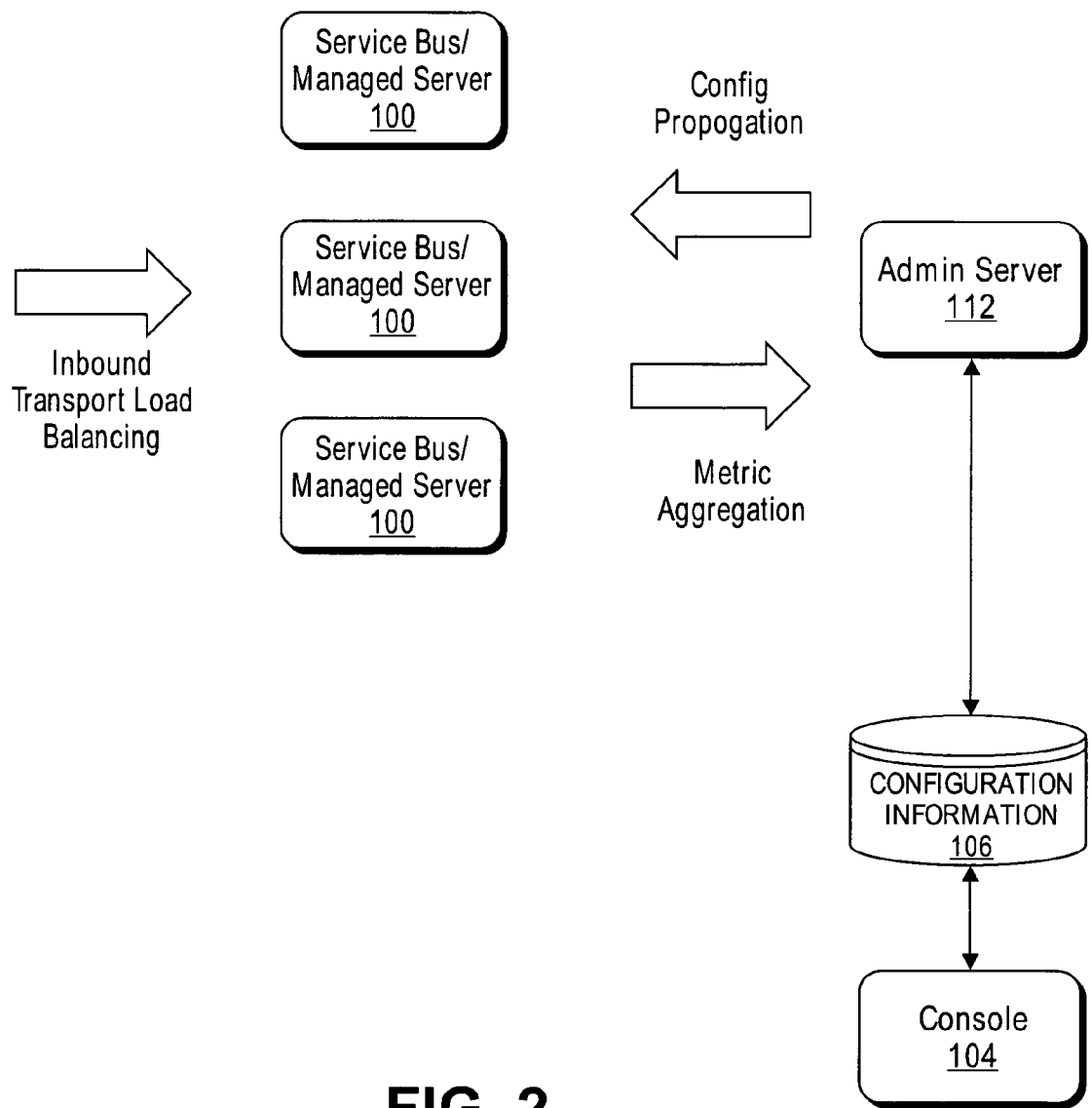
FIG. 2 is an illustration of the distribution of configuration information throughout an enterprise of one embodiment.

In one embodiment and with reference to FIG. 2, the configuration information is distributed throughout an enterprise by an administrative server 112 to one or more servers hosting service bus segment. In aspects of these embodiments, servers can be deployed in clusters as is well known in the art. Configuration information can be automatically propagated to service bus segments for fast local retrieval by service bus segments. Monitoring metrics can be automatically collected from all service bus segments for aggregation and display on the console.

In one embodiment, service hosted by the service bus ("service proxies") and services not hosted by the service bus ("external services") but which are invoked by the service proxies are both modeled as services. Service proxies act as stand-ins for, or facades of, services (i.e., external services and service proxies). By way of a non-limiting example, a service can include:

A set of concrete interfaces called ports (also called endpoints), each with a transport address and associated configuration. In one embodiment, the set of ports constitutes load balancing and failover alternatives for the service and are identical in characteristics.

An optional abstract interface which in one embodiment is a definition of the structure of message parts in the interface possibly broken down by operations.

A binding that defines the packaging of message parts in the abstract interface to a concrete message and the binding of that message to the transport.

Policies on Web Services Security (WSS) and Web Services Reliable Messaging (WS-RM), authorization policies, and actions needed to be performed transparently by the binding layer (e.g., logging).

In one embodiment, a Web Services Description Language (WSDL) representation of the abstract interface, concrete interface and binding is possible for Simple Object Access Protocol (SOAP) web services based on Hypertext Transfer Protocol (Security) HTTP(S) or Java Messaging Service (JMS) transports. In aspects of this embodiment, a WSDL resource or an existing service could be used as a template for a definition of a new service's interface. Also supported but not limited to, are email, file, WS-RM and File Transport Protocol (FTP) transports. In one embodiment, the service bus could periodically poll a file system directory to determine if a file is ready for processing in the case of a file transport. The service bus can support request/response and one-way paradigms for HTTP and JMS asynchronous transports. It optionally supports ordered delivery of messages if the underlying transport supports it. In a further embodiment, service bus supports external Markup Language (XML), non XML (structure described with MFL), binary, Multipurpose Internet Mail Extensions (MIME) with attachments (email), and SOAP packaging.

A service/service proxy process can have multiple ports for the same binding. These ports can be used as load balancing and fail over alternatives. A service/service proxy can define the load balancing policy to use for its ports. In one embodiment, the policies can include round robin and random (weighted or not weighted). The ports serve as load balancing destinations but can also service as fail-over alternatives on failure. The two concepts are coupled together for a high-availability load balancing scheme.

A service proxy can also define the retry policies on failure and (for request/response) a timeout policy and security policies that apply to messages in its interface. This can be specified at the service level (applies to all messages) or individual messages for the operations of the service.

In one embodiment, services are categorized by one or more category schemes. For example, categories can be key names and category values can be values for the key name. A service can have multiple values for multiple category names. Categories are useful for discovery purposes. There are a number of well-known ontologies (or category schemes) that define the key name and allowed hierarchy of values. In aspects of this embodiment, leaf values in a category hierarchy are used to categorize services. In one embodiment, a service consumer can be categorized for searching. Service consumers can be an organization or an application and can send messages (or receive sync responses). In yet another embodiment, a service consumer is associated with credentials and is tied to a user so it can belong to roles for authorization.

In one embodiment, a set of services can be provided by an organization or an application called a service provider. Defining a provider for a service is optional and there can have standalone services. For example, these can either be internal sub organizations in an enterprise or external partner organizations or even individual applications (semantics is up to the user). Also a service provider can be categorized like services for searching. A service provider can be associated with credentials and could be tied to a user so it can belong to roles for authorization. Service providers can send and receive messages.

In one embodiment, the implementation of a service proxy includes at least one message processing pipeline definition. For example, this can include a definition of a request pipeline definition and a response pipeline. Pipelines are message processing nodes that specify what actions are performed on request messages to the service proxy before invoking an external (or another proxy) service, and what processing is performed on responses from the service invoked by the service proxy before the service proxy returns a response to a client. Each pipeline can include a sequence of stages. A stage implements a programmatic interface and/or a protocol that is compatible with the pipeline. Messages fed into the pipelines are accompanied by a set of message context variables (that includes variables that contain the message contents) that can be accessed or modified by the pipeline stages.

By way of illustration, common pipeline stages include:

A transformation stage allows flow control "if" structures to be nested to select a transformation to be performed that affects the context. A web services callout or database lookup can be an alternative to an XML Query (XQuery) or Extensible Stylesheet Language Transformation (XSLT) transformation to set the output context variable.

A routing stage allows "if" structures and "case" structures to be combined (and nested) to define a single endpoint and operation to route the message to. A set of transformations that affects context variables can be defined before the message is published to each endpoint. A web services callout or database lookup can be an alternative to an XQuery or XSLT transformation to set the context variable.

A publish stage allows "if" structures and "case" structures to be combined (and nested) to define the set of endpoints and operations to publish the message to. A set of transformations that affects context variables can be defined before the message is published to each endpoint. A web services callout or database lookup can be an alternative to an XQuery or XSLT transformation to set the context variable. The changes to the context are isolated to each published endpoint and do not affect subsequent processing by the pipeline.

In one embodiment, WSS processing as well as authorization can be performed in the binding layer.

A tracking stage allows writing a tracking record with user defined information so the tracking system can be used to search by a user defined criteria.

An archiving stage writes the message to an archive for historical and record keeping purposes.

A logging stage allows logging of selected context to the system log for debugging purposes.

A validation stage validates a document against an XML or MFL schema.

A custom stage that implements a programmatic interface and/or protocol that is compatible with pipelines.

Figure 3:
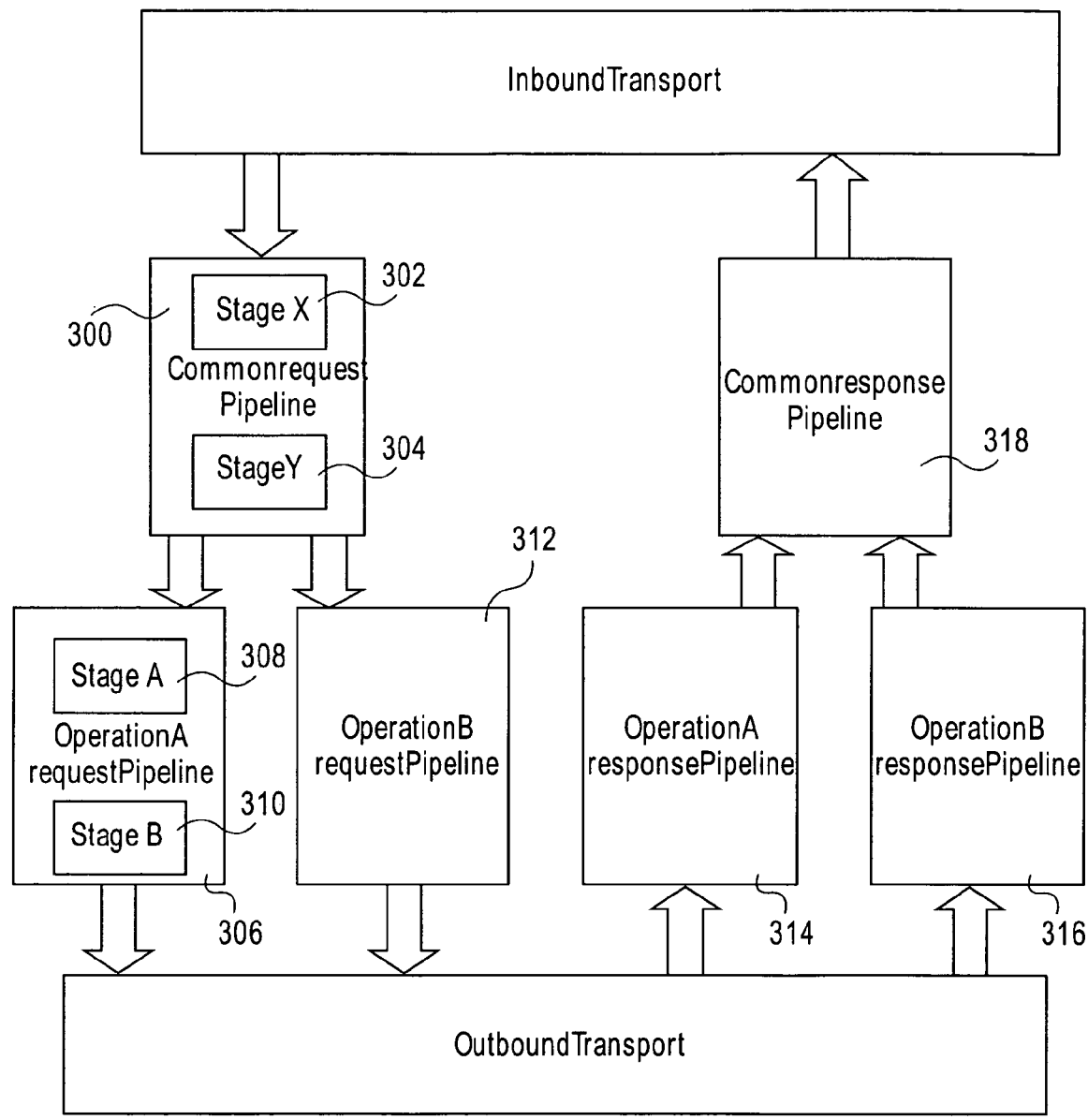
FIG. 3 is an illustration of message processing pipelines in accordance with an embodiment.

FIG. 3 is an illustration of message processing pipelines in accordance with an embodiment. An operational pipeline can process a message based on an operation indicated by the contents of the message. In one embodiment, the determination of the operation is performed through a user-selected criterion. Each pipeline can include one or more stages (e.g., 302, 304, 308 and 310). A single service level request pipeline 300 can branch out into a plurality of operational pipelines 306 and 312. The response processing staffs with the relevant operation pipeline (314, 316) which then joins into a single service level response pipeline 318. In one embodiment, in the case of one-way operations being invoked, the response pipeline is executed with an empty message. This permits a response to be constructed for the service proxy so bridging between request/response and one-way operations is possible (e.g., the service proxy input could be one-way while its output is request/response or vice versa). The service proxy either absorbs the response from the invoked service or generates one for the client.

In one embodiment, a context is shared across both the request pipeline and response pipeline, and other message processing nodes, and its value includes individual request/response messages. In aspects of this embodiment, the context is a set of predefined XML variables. New variables can be added and deleted to the context dynamically. The predefined context variables have by way of a non-limiting example, information about the message, the transport headers, security principals, the configuration information for the current service proxy and the configuration information for the primary routing and subscription services invoked by the service proxy. In one embodiment, the context can be read and modified by XQuery/Xupdate expressions by the stages.

By way of further illustration, the context can include the variables $header, $body and $attachments. These are wrapper variables that contain the SOAP headers, the SOAP body contents and the MIME attachments respectively. The context gives the impression that all messages are soap messages and non SOAP messages are mapped into this paradigm. In the case of binary or MFL data, the XML element that represents the document in $attachments or $body refers to the actual document with a unique identifier. In the case of SOAP RPC, the body content is itself a wrapper element that contains the typed RPC parameters.

In one embodiment, the system has a built-in type system that is available for use if desired at design time. When creating an XQuery expression in a condition or transformation at design time, the variable can be declared to be of one or more types in an editor to assist in easily creating the XQuery. In a further embodiment, the types can be specified in XML schemas, MFLs or WSDL resources. This type declaration process is aware of the nature of the variable to be typed (is a wrapper for elements of the types or the types themselves). It also provides assistance to access SOAP RPC parameters or documents in $body easily.

In one embodiment, a stage can have a sequence of steps to execute if an error occurs in that stage. This sequence of steps constitutes an error pipeline or handler for that stage. In addition an error handler can be defined for the whole pipeline or a whole service proxy. The lowest scoped error handler that exists is invoked on an error. This error handler allows the message to be published to an endpoint, formulate an error response message to be returned to the invoker of the service proxy, log the message, continue after modifying the context, or raise an exception. Raising an exception can transfer control to the next higher scoped error pipeline.

Figure 4:
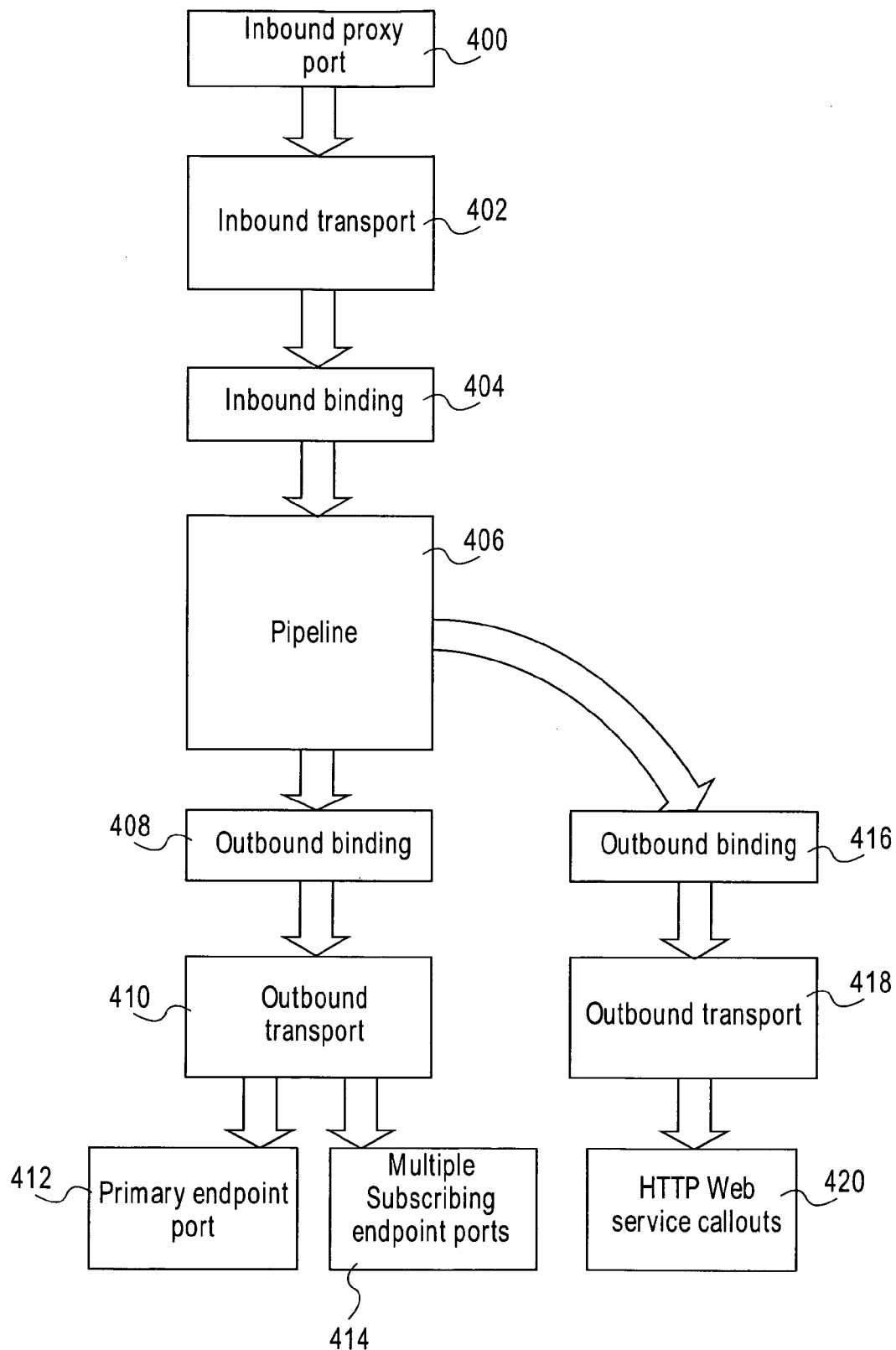
FIG. 4 is an illustration of pre and post pipeline message processing in accordance with an embodiment.

FIG. 4 is an illustration of pre and post pipeline message processing in accordance with an embodiment. The processing of a request consists of inbound transport 402 processing, inbound binding layer 404 processing, pipeline execution 406, outbound binding layer 408 processing, and outbound transport 410 processing. In aspects of these embodiments, the binding layer automates some of the processing to be performed such as mapping the message to/from context variables, packaging and un-packaging messages and performing WSS security and authorization. Both primary routing destinations and publish destinations can operate in this paradigm. In one embodiment, after the primary routing endpoint is invoked, the response pipeline processing follows a similar model. In yet another illustration, a web services callout 420 from a pipeline stage goes through a binding layer 416 followed by the transport layer 418. In one embodiment, the callout response follows the inverse path.

In one embodiment, identities are security principals who can either be humans, organizations, machine, applications, or processes. A identity can either invoke human interfaces (console user) or messaging interfaces (identity modeled as a service consumer or provider). A service consumer and provider can be associated with a identity for authentication of messages from that provider/consumer. A identity can belong to a group and a group can also belong to a group. Groups and identities can be associated with roles, which are the unit to which access rights to resources are assigned. In one embodiment, the resources, providers, consumers and services in the system can be organized into a set of projects, each with a hierarchy of folders not to avoid name conflicts but also provide a convenient way to organize resources and services belonging to some department and search for them.

In one embodiment, the console supports task level authorization. By way of illustration, a service bus console user or a process can operate in one or more of the following predefined roles:
- The integration administrator is the service bus super user and can do anything.
- The integration operator can use the console to monitor service bus activity, perform message tracking, and can suspend/resume services and change their hours of operation.
- The integration monitor has complete read access to everything and can export any resource, service, provider, consumer, or project.
- The integration deployer has complete read access to everything and can create, delete, edit, or import/export resources, services, providers, consumers, or projects.
- The integration security administrator can read, create, delete, edit credentials, keystores, users, groups, and authorization and role entitlement policies.

In one embodiment, resources are reusable common definitions and/or descriptions of processes/entities (e.g., configuration information for that entity). Resources are typically used by multiple services and are standardized definitions or descriptions across an enterprise or department. Examples of resources are category schemes, MFL schemas, XSD schemas, XQuery maps, XSLT maps, WSDL interfaces, and WS-Policy files. Category Schemes define a single category name and a hierarchical set of values for the category name. Services, providers and consumers can be categorized using a registered scheme. They can be categorized with multiple leaf values for a category scheme or leaf values from multiple category schemes. In one embodiment, all resources in the system can be looked up by name. In yet another embodiment, resources can be looked up by applying search filters to category schemes.

Schemas describe types for primitive or structured data. MFL schemas describe types for non XML data. XML Schema describes types for XML. An XML schema type can import or include other schema files. Transformation maps describe the mapping between two types. XSLT maps describe mappings for XML data using the XSLT standard. XQuery maps describe the mappings for XML and non XML (MFL) data using the XQuery standard.

A WSDL interface is a template for a service interface and describes the abstract interface of a service including the operations in that interface, and the types of message parts in the operation signature. It optionally also describes the binding of the message parts to the message (packaging) and the binding of the message to the transport. It also optionally describes the concrete interface of the service.

A WS-Policy describes security and reliable messaging policy of a services. Examples by way of illustration, it describes what should be signed or encrypted in a message using what algorithms. It also describes what authentication mechanism should be used for the message when received.

Figure 5:
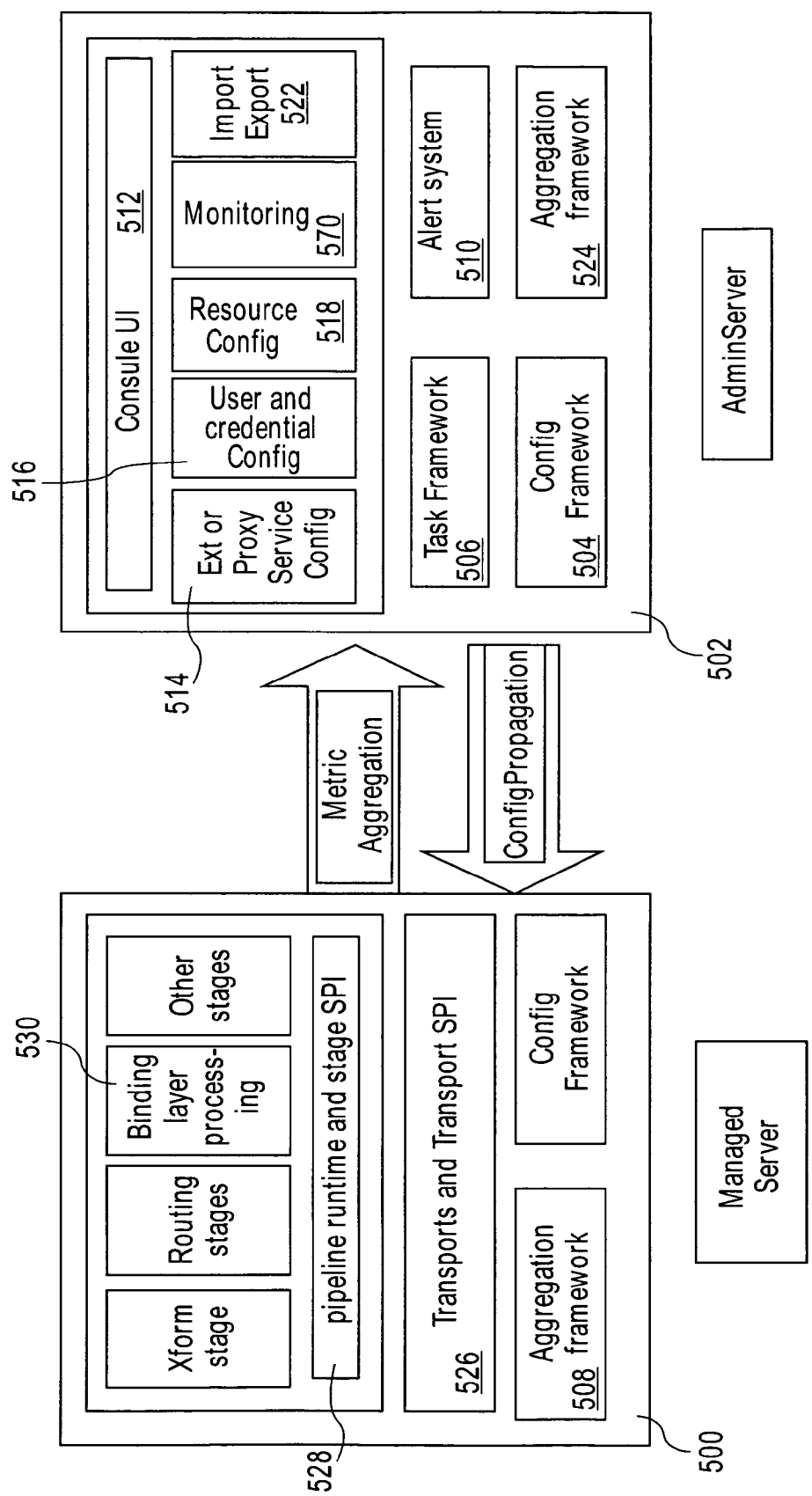
FIG. 5 is an illustration of component architecture in accordance with an embodiment.

FIG. 5 is an illustration of component architecture in accordance with an embodiment. The service bus segment can be deployed on a single server that also serves as the admin server 502 or on a cluster of servers (e.g., a cluster comprises of a clustered set of servers 500). A config framework component 504 can provide CRUD (Create, Read, Update, Delete) capabilities for configuration information along with object and file integrity protection, caching and indexing, referential integrity, and configuration propagation. The admin server can propagate the configuration information to the servers. Host the server bus segment.

In one embodiment, task framework component 506 can provide operational undo and serialization capabilities for tasks or composite tasks (task of tasks), which are config operations consisting of multiple CRUD operations on individual config objects. The unit of config propagation is a task and a task could involve execution of special code and could involve deployment of EARs or WARs in a service bus segment (primarily used for automatic database or light weight webapp deploys for transports) and supports coarse-grained concurrency control (task execution is serialized).

In one embodiment, aggregation framework component 524 can provide the capabilities to collect metrics and propagate them to the admin server for multi-segment aggregation. In one embodiment, the aggregated data gets coarser (in terms of duration), the older the data. For example for the last hour, the aggregation interval is 5 minutes. Before that, for the last day, the aggregation interval is 1 hour. Before that for the last week, the aggregation interval is 1 day, etc.

In one embodiment, alert system 510 analyzes aggregated metrics to determine if Service Level Agreement (SLA) rules are violated, and raises an alert if they are. In on embodiment, alert destinations can be email, web service, queue, etc. (more can be added where necessary).

In one embodiment, the console user interface (UI) component 512 is JSP based portlets that integrate with a portal. The console UI provides support for both monitoring and configuration on the console.

In one embodiment, the external and service proxy config component 514 defines the abstract, concrete, security and access policy and binding information for a proxy or external service interface. Service proxies are intermediaries hosted by the service bus server while external services are external endpoints to which messages are routed that reside in some other server. For a service proxy, it defines the sequential message processing performed by the service proxy for input and output messages based on a pipeline architecture. It also provides search capabilities when there are a large number of services.

The identity and credential config component 516 can define both UI and messaging identities along with attributes, and credentials that go with that identity in accordance with an embodiment. In aspects of this embodiment, identities can be hierarchically grouped into groups, and groups and identities can be associated with a role, which is granted access to a resource. Messaging identities can either be service consumers who can send messages or service providers which provide services that send or receive messages.

In one embodiment, resource config component 518 can be used to define shared resources such as (but not limited to) template WSDLs (Web Services Definition Language), WS security policies, schemas, ontologies (category schemes to classify services and service providers) and transformation maps that can be leveraged by multiple services. It also provides search capabilities when there are a large number of resources.

In one embodiment, the monitoring component 520 provides the monitoring UI for the service bus system to show alerts and metrics.

In one embodiment, the import/export component 522 allows movement of services and other resources between service bus installations. Design, Stage and Production are all separate vanilla service bus installations. Import allows specification of environment specific configuration parameters and the approach to use if the imported object already exists (replaces or keeps). It also allows resolution of unresolved references in an imported object by linking it to an existing object of the same type.

In one embodiment, the transport and transport SPI 526 component provides a framework to plug in new transports and also supports HTTP(S), JMS, email, FTP, file, WS-RM (Web Services Reliable Messaging) and timer event transports out of the box. Wherever possible, streaming, reliability, message ordering and request/response and one-way messages are supported.

In one embodiment, the pipeline runtime and stage SPI 528 component provides a framework to plug in new custom stages by the user and provides the context management and message flow through the request and response pipelines in a service proxy.

In one embodiment, service proxy pipelines can interface with the transport at either ends through a binding layer 530 that can handle message packaging, logging security processing and authorization based on policies defined with the service proxy (inbound) and invoked (outbound) external or service proxies.

In one embodiment, an endpoint has a Uniform Resource Identifier (URI)-based address. For example, a service is an inbound or outbound endpoint that is registered with a service directory. For example, it can have an associated WSDL, security settings, etc. A router is a named collection of pipelines. A pipeline is a named sequence of stages representing a non-branching one-way processing path. A stage is a user-configured processing step such as Transformation, Routing, etc.

A pipeline is a message processing node that can be part of a message processing graph. Below is a very basic overview of how messages flow through the system from an inbound endpoint (a service proxy) to outbound endpoint (typically an external service or another service proxy):

Transport Layer→Binding Layer→Message Processing Graph→Binding Layer→Transport Layer In one embodiment, the message processing graph is where message processing and manipulation can take place. Although the Binding and Transport layers primarily deal with communication and message packing/unpacking, message processing and manipulation can occur in these layers as well.

In one embodiment, the transport layer is responsible for handling communication with client and destination endpoints. It can support a variety of communication protocols, such as HTTP and JMS, and is responsible for generating configuration information containing such things as the endpoint URI and any relevant transport headers. With regards to message content, the transport layer primary deals with raw bytes in the form of input/output streams and transport-specific message objects such as instances of JMS Message classes. In another embodiment, the transport layer is simply for getting messages into and out of the system—it does not perform any manipulation of message content.

In one embodiment, the binding layer is primarily responsible for packing and unpacking the message. It can also serve as the intermediary between the transport layer, which deals mostly with byte streams, and the router, which can use a richer message context representation. For performance reasons, the binding layer can use on-demand processing to avoid unpacking a message and unmarshaling data until it is necessary.

In another embodiment, the binding layer is also where security processing is performed. On the inbound side, security processing is determined by the configuration of the receiving service proxy. On the outbound side, processing is determined by the configuration of the destination service. In another embodiment, the binding layer is service-specific and relies on configuration parameters to perform its task.

In one embodiment, routers are responsible for implementing the request and response logic of a service proxy. Request and response paths can be implemented using one-way message processing pipeline nodes that manipulate the message content. Conditional execution is made possible by using branching nodes to determine which of several pipeline paths to follow. The request path typically ends with a routing node that dispatches a request to another service or service proxy. The response from that service initiates response path processing, after which a response may be sent back to the service proxy client. The response travels the reverse direction through the message processing graph.

In one embodiment, pipeline nodes can be typed into one of three categories: request, response and error. Request pipelines are used for processing the request path of a router whereas response pipelines are used for processing the response path. Error pipelines are used as error handlers and are discussed in detail in a separate section below. Aside from indicating the pipeline's purpose, the type may be used to restrict which stages may appear in the pipeline. Any such restriction is left up to the individual stage implementation.

Figure 6A:
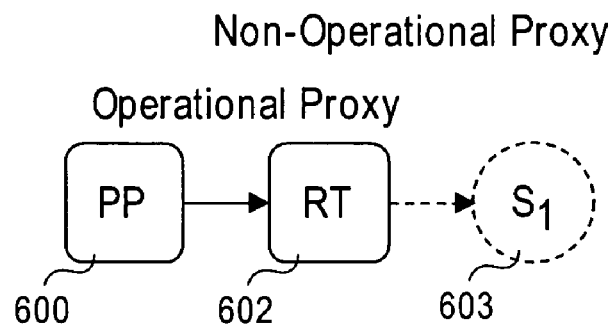
FIG. 6a illustrates a message processing graph having a single pipeline-pair node and a single routing node.
Figure 6B:
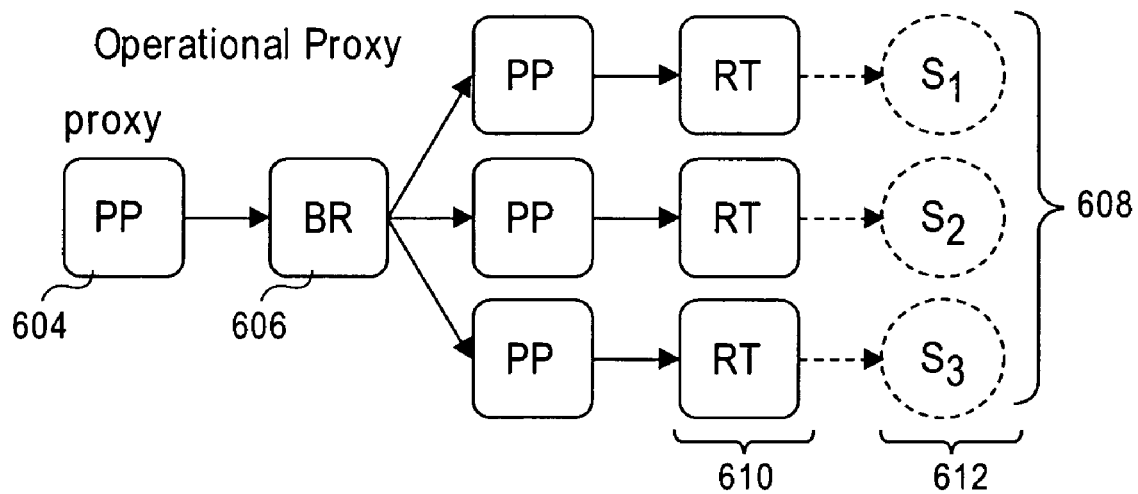
FIG. 6b illustrates a message processing graph with a branching node in accordance with an embodiment.
Figure 6B:
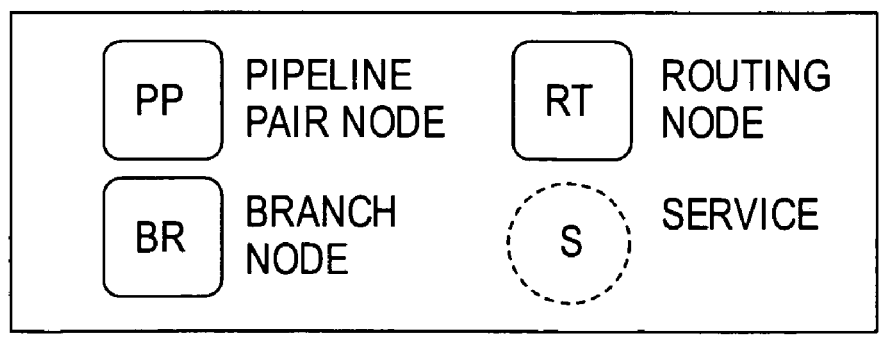

FIGS. 6a and 6b illustrate message processing graphs in accordance with an embodiment. As mentioned above, routers can implement the request/response logic of a service proxy using message processing pipelines. The request and response pathways are created by pairing request and response pipeline nodes together ("pipeline pair node") and organizing them into a logical tree structure or message processing graph. In one embodiment, a node implements a programmatic interface and/or protocol that is compatible with the message processing graph. A branching node allows for conditional execution and routing nodes at the ends of the branches perform any request/response dispatching. In one embodiment, the message processing graph allows for a clear overview of a service proxy's behavior, making both routing actions and branching conditions explicit parts of the overall design, rather than burying them deep inside of a pipeline stage. A request message follows a path in a first direction through the message processing graph. The associated response can travel a path in the reverse direction through the message processing graph.

In one embodiment, a message processing graph can include one or more instances of three top-level components (FIGS. 6a-6b):

A pipeline-pair node ("PP").
A branching node ("BR").
A routing node ("RT").

FIG. 6a illustrates a message processing graph having a single pipeline-pair node 600 and a single routing node 602 which is configured to forward messages to service 603. The pipeline pair node ties together a single request and a single response pipeline nodes into one top-level element. In another embodiment, a pipeline-pair node may have one direct descendant in the message processing graph. During request message processing, the request pipeline node can be executed when visiting a pipeline-pair node. When reversing the path for response processing, the response pipeline node can be executed.

The routing node can be used to perform request/response communication with a service in accordance with an embodiment. In aspects of this embodiment, the routing node represents the boundary between request and response processing for the service proxy. When the routing node dispatches a request message, request processing is considered over. When the routing node receives a response message, response processing begins. The routing node itself has support for conditional routing as well as outbound and response transformations. Whether conditions appear inside the routing node or up in the message processing graph as branching nodes is up to the user. In one embodiment, the routing node does not have any descendants in the graph.

FIG. 6b illustrates a message processing graph with a branching node in accordance with an embodiment. Branching node 606 allows processing to proceed down exactly one of several possible paths 608. In aspects of these embodiments, branching can be driven by a simple lookup table with each branch tagged with a simple but unique string value. A variable in the message context can be designated as the lookup variable for that node, and its value can be used to determine which branch to follow. If no branch matches the value of the lookup variable, then a default branch is followed. Setting the value of the lookup variable can be done before reaching the branch node. A branching node may have several descendants in the graph: one for each branch including the default branch.

In one embodiment, request processing begins at the root of the message processing graph when a request is received by a service proxy. At some point, the request message is conveyed to a pipeline-pair node where the request pipeline node is invoked to perform processing. When the request message is conveyed to a branch node, the request is further conveyed along the selected branch. When the message is conveyed to a routing node, routing is performed along with any outbound/response transformations. When a response message is received by the service proxy, it can be conveyed along a path which is the reverse of the path taken by the request message. The same thing occurs for any request path that simply ends without a routing node—the service bus initiates response processing and walks back up the graph, but without waiting for any response. During response processing, when we hit a pipeline-pair node, we execute the response pipeline node. When we hit a branch node, it is treated as a no-op and the response is conveyed to the element that preceded the branch. When the response finally reaches the root of the graph, a response is send back to the requesting client (which could be another service or service proxy).

In one embodiment, any element may appear at the root of the message processing graph. One of the simplest of router designs is to have just a routing node at the top representing the entire graph. There is also no restriction on what two elements may be chained together. For example, two pipeline-pair nodes may be chained together without a branching node in between. With regards to branching, each branch may start with a different element—one branch may immediately terminate with a routing node, another may be followed by a pipeline pair and yet another may have no descendant whatsoever. In the latter case, a branch with no descendants simply means that response processing begins immediately if that branch is selected. In general, however, a message processing graph is likely to come in two forms: for non-operational services, the graph is likely to consist of a single pipeline-pair at the root followed by a routing node. For operational services, the message processing graph is likely to consist again of a single pipeline-pair at the root, followed by a branching-node based on operation, with each branch consisting of a pipeline-pair followed by a routing node.

In one embodiment, routers can be used with WSDL-based services so there is a need to perform processing that is operation-specific. Rather than requiring users to manually configure a branching node based on operation, the system can provide a zero-configuration branching node that automatically branches based on operation. A branch can be created for each operation defined on the service and the branching variable can of course be $operation.

Errors can occur during message processing for various reasons (e.g. transport errors while routing, validation errors while transforming, security errors while unmarshalling etc.). Typically, these errors originate from a specific stage, routing node or from the binding layer, as that is where most of the router logic can be implemented. In one embodiment, the system provides a mechanism to handle these errors by allowing the user to define error handlers. In one embodiment, an error handler is essentially another pipeline node that allows the user to perform various actions such as logging, transformation and publish to handle the error as appropriate.

In one embodiment, an error handler can be configured for the entire service proxy as well as for every pipeline node and stage within it. When an error occurs, it is handled by the inner-most encompassing error handler. For example, if a transformation error occurs in the transformation stage, it can be handled by that stage's error-handler. If no such error-handler is configured, it can then be handled by the next level error handler, which is that of the pipeline that contains the transformation stage. If that error handler does not exist, it is then handled by the router-level error handler. If that fails, then a default system-level error handler can process the error.

Figure 7:
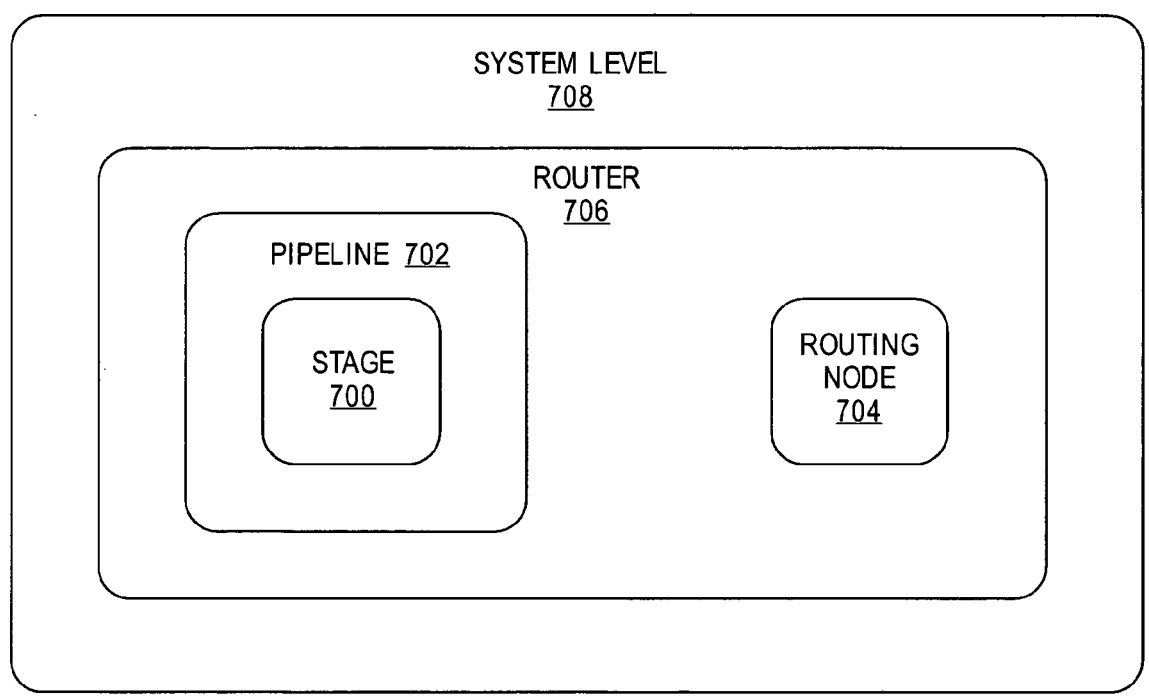
FIG. 7 is an illustration of error handling scopes in accordance with an embodiment.

FIG. 7 is an illustration of error handling scopes in accordance with an embodiment. Each enclosing box represents an error-handling scope. As can be seen in the figure, the next level error handler for uncaught errors that occur in a routing node 704 is at the router-level scope 706. If there were no handler at this scope, a handler at the system level scope 708 would be invoked. For a pipeline stage 700 that does not catch its own errors, the errors can propagate to the pipeline scope 702. If no error handler is defined there, the errors can propagate to the system level scope 708.

Every component, be it stage, pipeline or router can have an error handler. In one embodiment, since the inbound binding layer is not associated with any particular stage or pipeline, errors that occur in the binding layer can be handled by the router-level error handler. Outbound binding layer errors may occur in several places, depending on what entity is performing communication. For example, binding layer errors that occur during routing can be caught by the routing node's error handler. Similarly, binding layer errors that occur during a publish operation in a publish stage can be caught by the stage-level error handler. In one embodiment, an empty or un-configured error handler is identical to not having an error handler at all. In our previous transformation example, if the stage-level error handler was created but never configured, then the error can "bubble-up" to the next level handler.

In one embodiment, when an error handler can finish processing with one of three actions: rethrow, reply and continue. The rethrow action means that the error is rethrown and is to be handled by the next level error handler. Unless specified, the default behavior of an error handler is to rethrow, which is why an empty error handler behaves like a non-existent error handler. The reply action means that a response should be generated immediately for the service proxy client. All further pipeline processing is immediately halted and the response message is sent based on the state of the message-related context variables. It is therefore up to the user to configure the error handler to transform these variables as necessary to generate a meaningful response message.

The continue action is used to continue pipeline processing as if no error occurred at all. Processing continues at whatever point the error was successfully consumed. This may require that the user configure the error handler to fix-up the context variables as they may be in a state that is not expected by the rest of the router. When an error handler consumes an error, processing resumes as if the component associated with the error handler had just finished executing successfully. For example, if an error occurs in a stage and an error handler associated with that stage consumes the error, then processing continues with the next stage in the pipeline as if the stage has finished successfully. However, if there is no error handler configured with the stage or if the error handler rethrows the error, it could be consumed by the pipeline-level error handler. If so, processing resumes as if that entire pipeline had finished executing successfully. For example, if that pipeline was a service request pipeline, then we may proceed with the operational request pipeline. For the router-level error hander, continue is identical to reply, as the next action after successfully executing the router is sending a response to the client.

Since in one embodiment an error handler is just another pipeline, it can be configured just like any other pipeline. For example, the publish stage may be used to send error notifications to other services, the transformation stage may be used to modify the context variables, etc. Some stages, however, are not allowed to appear in an error handler. At the moment, the prohibited stage is the routing stage.

In addition to the standard context variables, there are two additional context variables available to an error handler in further aspects. These variables are set when the error handler is invoked and are automatically removed if normal pipeline processing is resumed via continue. The two variables are $fault and $faultAction. The $fault variable holds information about the error and where it occurred. This variable may be used along with other context variables to perform conditional actions in stages such as publishing and transformations. The error handler may even modify the contents of $fault before rethrowing the error up to the next-level error handler.

$faultAction is a special variable that determines what action can be performed once the error handler has finished executing. In one embodiment, it is a simple string-valued variable that may take on one of three values: "rethrow", "reply" and "continue". When the error handler finishes executing, this variable is examined to determine whether the service proxy should rethrow the error, reply immediately to the client or continue processing. This variable is initialized to a value of "rethrow", so a transformation is necessary to change the value to either "continue" or "reply" if the user wishes to change the default rethrow behavior of an error handler.

In one embodiment, the context is a property bag. Each property ("variable") has a name and an associated value. Pre-defined context variables are used to represent pieces of the message in the pipeline as well as to hold information about the inbound and outbound service endpoints. Additional variables may also be introduced during pipeline processing. In one embodiment, context variables can be manipulated with XQuery expressions. Pipeline stages may internally manipulate the context as part of their behavior.

Below is a list of the system-defined context variables in one embodiment along with a brief description in accordance with an embodiment.

header—contains SOAP headers for SOAP messages.
    body—contains the SOAP body for SOAP messages.
    attachments—contains message attachments.
    inbound—contains information about the service proxy that received the request.
    outbound—contains information about the target service where a message is to be sent.
    operation—identifies the Service proxy operation being invoked (if applicable).
    fault—contains information about any error that has occurred during processing.
    faultAction—specifies what action should be taken after executing an error handler.

In one embodiment, header, body and attachments represent the state of the message as it flows through the message processing graph. Modifying the message can be accomplished by modifying these variables. These variables are initialized using the message content received by the service proxy and are used to construct an outgoing message when dispatching to other services (e.g. via routing). All message-related variables are updatable by message processing nodes and stages. The variables are entirely independent and may be modified individually.

When a message is sent by the service proxy a choice can be made as to which variable's content to include in the message. That determination is dependent in one embodiment upon whether the target endpoint is expecting a SOAP or a non-SOAP message. In the case of SOAP, header and body are combined in a SOAP envelope to create the message. In the case of non-SOAP, payload is the entire message. In either case, if the service is expecting attachments, then a MIME package can be created out of the resulting message and the attachments variable.

The header variable contains any SOAP headers associated with the message. It points to a <SOAP:Header> element with headers as sub-elements. If the case of non-SOAP messages or SOAP messages that have no headers, the <SOAP:Header> element can be empty, having no sub-elements.

The body variable represents the core message payload and points to a <SOAP:Body> element. In the case of SOAP messages, the SOAP body is extracted from the envelope and assigned to the body variable. If the message is non-SOAP or not XML, then the full message contents are placed within a newly created <SOAP:Body> element. Thus, the core payload for both SOAP and non-SOAP messages would be available via the same variable and with the same packaging (e.g. wrapped in a <SOAP:Body> element).

The attachments variable holds any attachments associated with the message. In a further embodiment, the attachments variable is a single-rooted piece of XML that has one sub-element for each individual attachment. These sub-elements contain information about the attachment (derived from MIME headers) as well as the attachment content. In aspects of this embodiment, an attachment element can include the following elements:

Content-ID—a globally-unique reference that identifies the attachment.
    Content-Type—specifies the media type and sub-type of the attachment.
    Content-Transfer-Encoding—specifies how the attachment is encoded.
    Content-Description—a textual description of the content.
    Content-Location—a locally-unique URI-based reference that identifies the attachment.
    Content-Disposition—specifies how the attachment should be handled by the recipient.
    Body—holds the attachment data.

In one embodiment, inbound and outbound variables contain information about the inbound and outbound endpoints. The inbound variable contains information about the service proxy that received the request message, whereas the outbound variable contains information about the destination service (e.g. the route) where a message can be sent. The variables have the same XML schema and contain "service", "transport" and "client" sub-elements as well a single "name" attribute that identifies the name of the endpoint as it is registered in the service directory.

In one embodiment, a service variable contains general information about the service and can include the following elements:

providerName—holds the name of the service provider versionGroup—identifies the version group of the service version—identifies the version number of the service relative to the version group.

operation—identifies the name of the operation being invoked on the external service.

In one embodiment, the transport element contains transport details about the service and can include the following elements:

uri—identifies the URI of the endpoint. For inbound, this is the URI by which the message arrived. For outbound, this is the URI to use when sending the message, which overrides any URI value registered in the service directory.

request—transport-specific configuration information about the request including transport headers. Each transport may have its own specialization of Request-Configuration information, so the structure of this element ultimately depends upon the transport being used.

response—transport-specific configuration information about the response including transport headers. As with RequestConfiguration information, the structure of this element ultimately depends upon the transport being used.

mode—indicates if the communication style is request-(one-way) or request-response (two-way).

securityType—indicates the type of security for the transport. In one embodiment, the possible values are "none", "basic", "one-way-SSL" and "two-way-SSL".

accountAlias—This element identifies an alias to an external-service account registered with the credential manager. The transport layer can use this value as the key in a credential manager lookup to fetch the username/password to use on an outbound HTTP/S connection.

qualityOfService—specifies the quality of service expected when sending a message. In one embodiment, possible values are "best-effort" and "exactly-once".

retryCount—number of retries to use when sending a message.

retryinterval—the interval in seconds to wait before attempting to resend a message.

In one embodiment, a message processing stage can utilize XQuery and/or XUpdate to manipulate the context. Each variable in the context can be represented as an XQuery variable of the same name. For example, the header variable can be accessible in XQuery as $header.

In one embodiment, context variable values can be generated on-demand and streamed as much as possible. For example, the incoming request and response message can be returned by the transport layer as a Java® InputStream. In the case of pass-thru processing, the stream is not touched until it is time for the service proxy to send it to another service or service proxy. For SOAP messages, the headers variable can be un-marshaled without having to materialize the body. Likewise, attachments can be unpacked if the attachments variables is accessed. In the case of operation, it too should trigger inspection of the request message to determine the operation being invoked if the variable is specifically accessed.

In addition to routing, transformation and monitoring, the service bus includes various features that make it possible to secure message exchanges between clients, service proxies and services. In one embodiment, the service bus offers: message confidentiality, message integrity, server authentication and client authentication over TLS/SSL; message level confidentiality, integrity and sender authentication for soap messages; access control at both the transport and message level; credential management; and security auditing.

In one embodiment, the security features in service bus make use of the pluggable security provider architecture and security services, such as: authentication, identity assertion, authorization, role mapping, auditing, credential mapping, and certificate lookup and validation. Service bus can make use of all these providers as building blocks to provide higher-level security services. Users can replace any of these out of the box providers with third party providers or their own custom providers. In one embodiment, service bus security can be provided by BEA AquaLogic Enterprise Security™, available from BEA Systems, Inc.

Figure 8:
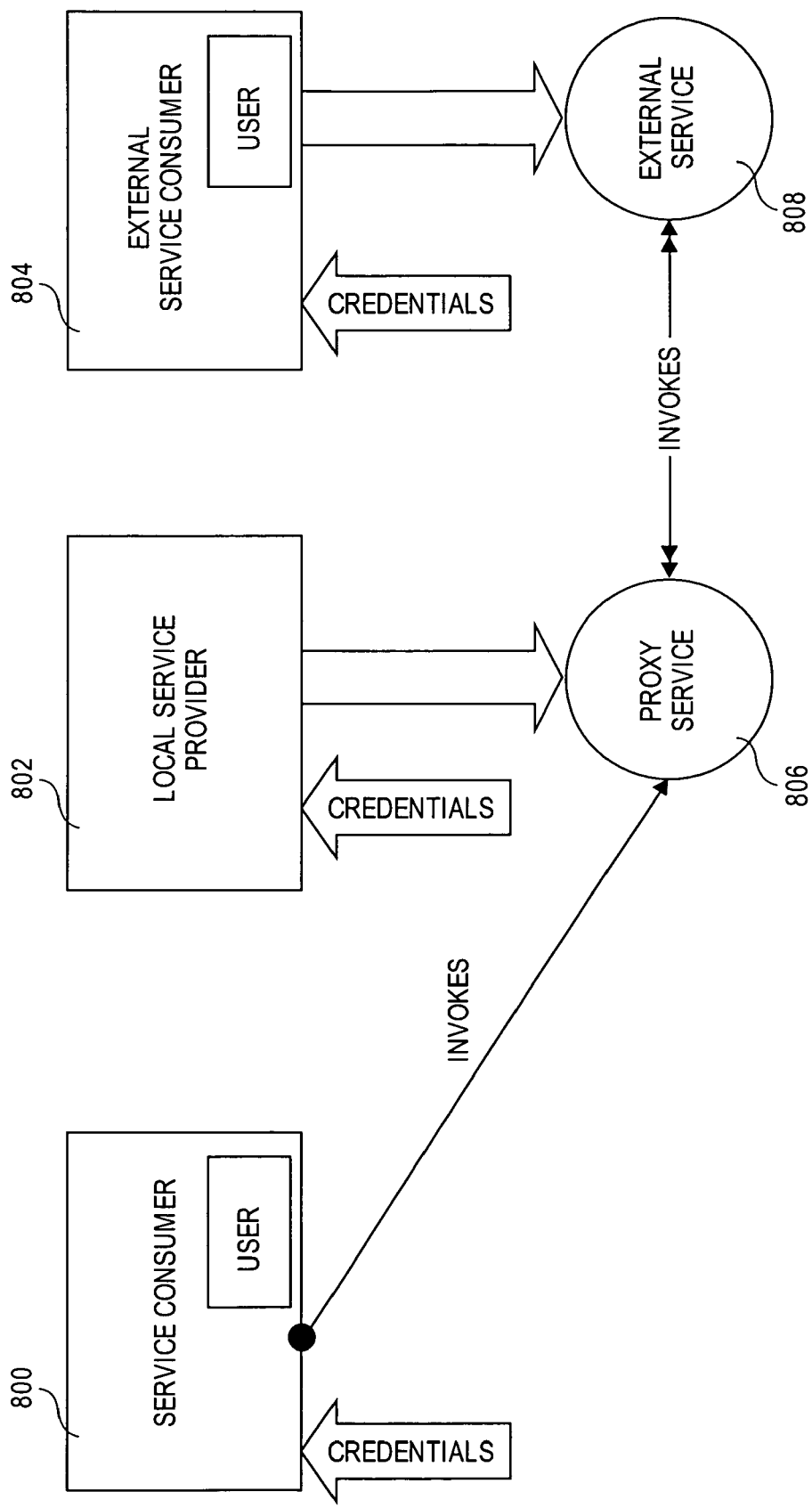
FIG. 8 is an illustration of service providers in an embodiment.

FIG. 8 is an illustration of service providers in an embodiment. One or more external services 808 are provided by external service providers 804. Intermediary service bus services are termed service proxies 806 which can be provided by proxy (or local) service providers 802. Service providers are applications, organizations or departments that have a security identity. Clients that invoke a service proxy and have a security identity are termed service consumers 800. External service providers are inherently service consumers also since they can respond synchronously or asynchronously to a request.

In various embodiments and by way of illustration, the service bus and external services can be in the same network, behind a firewall, or on different networks with firewalls between service consumers and service buses and/or service buses and external services. In one embodiment, service proxies and target services are collocated in the same domain. A special case of this can be Business Process Management (BPM). At the other end of the spectrum, service bus proxies receive messages from, or route messages to, trading partners outside of the organization.

In one embodiment, identity management deals with the create, update and delete operations of identityes, groups in a given authentication provider. These providers are part of the security framework. In addition, identity management also allows for the creation of properties associated with an identity. Identity, groups can be configured with the console are used for the authentication of console users and message senders.

In one embodiment, a identity is an entity in the authentication provider. Multiple authentication providers are supported. A group is a logical grouping of identities whose membership is static and assigned to by the administrator of that group. A role is a logical entitlement of capabilities calculated dynamically based on role conditions or policies. Entitlement of roles is provided by a role entitlement provider configured in the security framework. An administrator can create, read, update and delete identity, groups in any of the authentication provider supported. Access control policies are typically based on roles.

In one embodiment, the service bus supports transport level confidentiality, message integrity, and client authentication for one-way requests or request/response (from clients to service bus) over HTTPS. The service bus can enforce policy based authorization and can audit authentication and authorization events. Alarms can be triggered when authentication or authorization fails. In one embodiment, when a service proxy is activated, the service bus can generate and deploy a thin web-application on the fly. An application server (e.g., WebLogic® Server) can provide server-side SSL support, including session management, client certificate validation and authentication, trust management and server SSL key/certificate manipulation.

In one embodiment, the application server can send its certificate to the client in the SSL protocol. In other words, the client authenticates the server. In addition to that, during the SSL handshake the server may request the client to send its certificate to the server so that the server authenticates the client. This is typically called 2-way SSL. When the client is not requested to send its certificate it is called 1-way SSL. Higher-level protocols on top of SSL are free to define their own authentication mechanism. With HTTPS, for example, once the SSL handshake is completed, clients can authenticate to the server by sending their username and password in the WWW-Authenticate HTTP header. This is called BASIC authentication.

In one embodiment, if the service proxy has been configured to require client authentication, the server can authenticate all requests to the service proxy endpoint. For BASIC authentication, the server can authenticate the client against the authentication providers configured, e.g. LDAP, active directory, etc. For CLIENT-CERT authentication, the SSL engine can validate the client certificate. Once trust in the certificate has been established, the certificate is passed to the identity assertion providers to extract the client identity. In aspects of this embodiment, the identity assertion providers are another component of the server security framework. Identity asserters are configured to extract some field of the certificate to use as the client identity, typically the CN (common name) or E (email) of the SubjectDistinguishedName in the certificate. Finally, the authentication providers are invoked to collect all groups the identity belongs to. The end result is a signed Java Authentication and Authorization Service (JAAS) Subject with one principal holding the client identity and one principal for each group the identity belongs to.

In one embodiment, the service bus also supports BASIC client authentication on HTTP proxies. When an HTTP/HTTPS proxy is first deployed, an authorization policy for the service proxy URI is stored in the authorization provider. In one embodiment, service bus supports XACML. As the syntax by which to describe authorization policy.

In one embodiment, if the service proxy does not require client authentication then the initial authorization policy grants access to all requests. If the service proxy requires client authentication (BASIC or CLIENT-CERT) the initial policy grants access to all authenticated clients (but anonymous requests are rejected). Security administrators can change the access control policy on the service bus console. In one embodiment, a service bus, the user can choose between the following policies: Unchecked (all requests are granted access); Excluded (all requests are rejected); Authenticated users (anonymous requests are rejected); and a set of roles.

In one embodiment, successful authentication results in a JAAS Subject that wraps the client identity principal and one principal for each group the user belongs to. Identity can be assigned to groups. Roles can be defined in terms of groups (or other criteria, e.g. time-of-day). The set of roles a identity belongs to is determined dynamically at runtime. If the authorization policy is a set of roles, then identities that belong to one or more of those roles can be granted access. In one embodiment, If authentication succeeds, the web-container invokes the service bus HTTP/HTTPS transport provider. From there the message proceeds to the service bus binding layer. The binding layer stores the client principal from the authenticated JAAS Subject in the message context and invokes the request pipeline. Pipeline stages can make use of the client principal in business rules. For example a client-specific transformation may be applied, or the routing table conditions may take into account the client principal.

At the end of a request pipeline node, proxies typically route the message to a target service. The target service can be determined by a routing stage in the pipeline. The routing stage can route to the same target service or can dynamically choose the target service based on some conditions. Either way, the target service is specified as a reference to an external service (or a service proxy). In one embodiment, the service is registered in a service bus Service Directory. Administrators use the service bus console to register external services. In another embodiment, the service is registered in an external UDDI registry.

In one embodiment, when the external service is registered, the service transport and one or more URLs for the service are entered. This is the transport and URL(s) the service proxy can use to route requests to that particular external service. If the transport is HTTPS, then one of the following authentication methods can be specified: BASIC, CLIENT-CERT or no client authentication. If the transport is HTTP, BASIC or no client authentication is supported. If the authentication method is BASIC, then an optional ServiceAccount can be specified. Outbound (client, e.g. proxy) authentication can be covered later.

In one embodiment, the service bus supports transport level security for one-way and request-response messages sent over HTTP(S), between service bus proxies and external services. HTTPS offers confidentiality and integrity. It also allows service bus to authenticate the target server. Additionally, if required, service bus proxies can authenticate to the external service. This is similar to inbound transport security, but in this case service bus is initiating the HTTPS connection. Note that in the outbound case, from an SSL protocol point of view, the service proxy is acting as the client and the server running the target service as the server. The service bus HTTPS transport provider sends HTTP requests over an HTTPS connection to the target server and accepts the HTTP response. The target server can send its SSL certificate to the service bus.

In one embodiment, two client authentication methods can be used with HTTP/S: CLIENT-CERT and BASIC. If the external service is configured with CLIENT-CERT authentication, then during the SSL handshake the service proxy can send its SSL certificate to the target server. In one embodiment, service proxies are optionally associated with local service providers. The credential manager binds credentials to local service providers. A local service provider can have a private key and certificate for SSL client authentication. This is the key/certificate the service proxy can use during the SSL handshake. Many service proxies can share the same SSL client key/certificate by virtue of referencing the same local service provider.

In one embodiment, an external service may require the service proxy to authenticate by sending a username and password. This is typically done over HTTPS, but service bus also supports BASIC authentication over HTTP. HTTPS provides an encrypted channel; therefore it is safe to send the password over HTTPS. On the other hand, HTTP with BASIC authentication is strongly discouraged because the password goes in clear-text (base64-encoded) on the wire.

On one embodiment, when an HTTP or HTTPS external service is configured with BASIC authentication, an additional service account can be optionally specified. If no service account is specified, then the service proxy can determine the username and password to use from the credential manager, in a way analogous to how the service proxy SSL client key is retrieved: the service proxy is associated with a local service provider and a username/password is associated with the local service provider. If the external service specifies a service account, then a username and password for that service account is stored in the credential manager. In this case the service proxy does not get the username and password from the local service provider; instead the service proxy sends the username/password of the service account.

In one embodiment, the message context has an element that allows pipeline node designers to specify the name of a service account to use for retrieving username/password credentials. A transformation stage in a request pipeline can set this element of the message context. If specified, this service account overrides both the local service provider credential In one embodiment, the service bus supports OASIS Web Services Security (WSS or WSS for short). WSS defines a framework for message confidentiality, integrity and sender authentication for SOAP messages. WSS applies to individual SOAP envelopes. WSS uses XML-Encryption and XML-DSIG as building blocks. The WSS runtime on the client encrypts and/or digitally signs one or more individual message parts. In one embodiment, a new SOAP header is added to the envelope. The WSS header includes the XML-DSIG digital signatures, security tokens and other constructs. These security tokens can be used for sender authentication, key-wrapping (basically carrying a randomly generated symmetric encryption key encrypted with the recipient's public key), carrying the signature verification certificate, or for including a certificate with the encryption public key of the sender (so that the recipient can encrypt the response). The result is a new SOAP envelope. When the recipient consumes the secured envelope, the cryptographic operations are performed in reverse order and the security header is removed. The recipient then verifies that the message conforms to its policy (e.g. required message parts were signed and/or encrypted, required tokens are present with the required claims and more).

In one embodiment, individual parts of a SOAP envelope can be digitally signed and/or encrypted. The resulting message is still a valid SOAP envelope. For example, the body may be encrypted, a WS-Addressing header may be signed and yet another header may be neither signed nor encrypted. WSS does not rely on a secure channel. Instead, one or more parts of individual SOAP envelopes are protected. This SOAP envelope is sent over whatever underlying protocol/transport is being used, for example HTTP or JMS. The security measures are built into the message itself, the message is protected beyond the transport protocol, all the way to the application layer. Furthermore, an intermediary can relay the message while preserving the security properties of confidentiality, integrity and authentication. Thus end-to-end confidentiality, message integrity and sender authentication can be achieved.

By way of illustration, an inbound WSS-secured message can be:
  A request from a service consumer to a proxy. The service consumer applies WSS to the request and the service proxy processes the security header and enforces the security policy.
  A request from a service consumer to a proxy. The service consumer applies WSS to the request but the service proxy does not process the security header and does not enforce the security policy. The service proxy routes the request to an external service. The external service processes the security header and enforces the policy. This is a request pass-through scenario.
  A response from a target service to a proxy. The target service applies WSS to the response and the service proxy processes the security header and enforces the security policy.
  A response from a target service to a proxy. The target service applies WSS to the response but the service proxy does not process the security header and does not enforce the security policy. The service proxy forwards the response to the service consumer. The service consumer processes the security header and enforces the policy. This is a response pass-through scenario.

By way of illustration, an outbound WSS-secured message can be:
  A message from a proxy to an external service. The service proxy applies WSS to the message and the target service processes the security header and enforces the policy.
  A response from a proxy to a service consumer. The service proxy applies WSS to the message and the service consumer processes the security header and enforces the policy.

By way of further illustration, a service consumer can send an encrypted WSS SOAP message to a service proxy for routing, the service proxy routes the message, perhaps based on the value of some clear-text header, for example a WS-Addressing header or a custom header, the back-end service receives the encrypted message, decrypts it and processes the request. The service then sends a response, encrypted with the client's public key. The service proxy delivers the response to the client. The service proxy doesn't need to decrypt the message. The service consumer and back-end service can be assured that the service proxy is not able to read sensitive data (because the service proxy does not have the decryption keys). Similarly, the service consumer may include a security token for authentication purposes and the service proxy can relay the token to the target service.

In one embodiment and by way of illustration, service proxies can be configured to process the WSS header on the incoming request from service consumers, for example when service bus is used as a gateway for incoming requests from external business partners. This may be useful to offload a back-end service from computationally intensive decryption, signature verification and authentication operations, when the service proxy and target service are collocated, to enforce access control at the gateway, and when the target service does not support WSS. In one embodiment, the service consumer encrypts and/or signs one or more parts of the message, and/or includes an authentication token. The service proxy authenticates the token, decrypts the message and verifies the digital signature. Authorization based on the WSS authentication token and message content can happen here. The clear-text message then goes through the request pipeline. At the end of the pipeline the message is routed to the target service.

By way of illustration the service proxy can apply WSS to the message on behalf of a service consumer. In this case the service proxy receives a clear-text message from the service consumer. The message flows through the request pipeline as usual. At the end of the pipeline, once the target service has been determined and before actually sending the message, the service proxy encrypts and/or signs and/or adds an authentication token to the message. This new secured SOAP envelope is delivered to the target service.

In one embodiment, the system supports the OASIS Web Service Security standard, as well as the Username Token Profile and X.509 Token Profile. Back-end services, clients and service proxies can be configured with optional WS-policies modeled after the Web Services Policy Framework (WS-Policy) specification developed by BEA, IBM, Microsoft, SAP, Sonic Software, and VeriSign. This framework defines an extensible architecture for specifying and configuring web service requirements and capabilities.

In a given request/response round-trip, all four messages can be individually protected. Each of the four messages in the overall message path is potentially subject to the requirements specified in WS-policy. The sender can apply the necessary steps to produce a message that conforms to the policy, for example by signing and/or encrypting one or more message parts, and/or including the required authentication tokens. The recipient can perform the necessary steps to consume the message, that is, decryption, signature validation and token validation/authentication. In addition, the recipient can verify that the message does in fact conform to the policy.

In one embodiment, the service bus can be configured with the credentials it needs to securely interact with service consumers and external services. In particular, on inbound messages, the service bus may be configured to:

Send its (server) credentials so that the client can authenticate the service bus server (for example during the SSL handshake).

Authenticate the message sender at the transport level or message level.

Decrypt an encrypted message with service bus's private decryption key.

Verify a digital signature on an incoming message.

On outbound messages the service bus may be configured to:

Authenticate the server at the other end of the connection (for example during the SSL handshake).

Authenticate itself to the recipient at the transport level or message level.

Encrypt the message with the public key of the intended recipient.

Sign the message for authentication or data integrity purposes.

A service bus Credential Exchange component can provide an operations, administration and maintenance API and a runtime API for managing credentials and retrieving credentials. Credentials can fall into two categories: External credentials (credentials belonging to external services or service consumers that interact with service proxy); and Local credentials (credentials belonging to service proxies or the service bus system as a whole).

In a further embodiment, credentials can be categorized by type. The service bus can support username/password, private-key/X.509 certificate chain and trusted X.509 certificates. A Credential Exchange Server can be extended to support other credential types. In one embodiment, credentials, whether external or local, can be bound to a service bus resource. For example, if the web service security policy of a proxy requires the SOAP body of inbound messages to be encrypted with RSA, there can be a private-key and X.509 certificate chain bound to the service proxy. The Credential Exchange Server manages these bindings between service bus resources and credentials.

In one embodiment, the Credential Exchange Server manages these credentials:

For local service providers: Encryption certificate and corresponding private key; Digital signature private key and certificate; Username/password; SSL private key and certificate for local service provider, used for SSL client authentication; Private key and certificate for WSS authentication (X.509 Token).

For external service providers: Encryption certificate; Digital signature verification certificate; Username/password; SSL client certificate; SSL server certificate; X.509 authentication certificate (for WSS X.509 Token authentication).

For service consumers: Encryption certificate; Digital signature verification certificate; Username/password; SSL client certificate; X.509 authentication certificate for WSS authentication (X.509 Token).

In one embodiment, a rule is basically a statement that evaluates an expression and (usually) yields a Boolean result. A rule can include a list of associated actions that are executed if the rule evaluates to "true". The conditions included in a rule could range from current time of the day (a business Calendar, for e.g.) to runtime context data, user profile and so on. By way of a non-limiting example, rules can be used to trigger SLA alerts based on system health and response times, dynamically adjust the "cost/health" of service bus services based on certain conditions, raise notifications in case of security violations, and detect denial of service attacks. For example:

Rule 1: If the average response-time of Service Order-Router "is greater than" 350 milliseconds then Notify Rule 2: If Between 9 am and 5 pm the response-time of Service CreditCheck "is greater than" 10 seconds then Invoke Web Service "Log a trouble ticket"

In one embodiment, rules can be created via the console and represented in XML. An XML configuration schema can define the rule format. The service bus rule engine can support several different kinds of rules, depending on the location of the rule. The various rule types are described in further detail later in this document. In one embodiment, service bus rules have the following format:

If <set of conditions> then <perform a set of Actions>

By way of a illustration, conditions can be based on: time (calendar) and monitoring data aggregated by the monitoring framework. This can be easily extended to include many more condition types such as identity profile attributes, pipeline context runtime data and so on. In one embodiment, each condition type registers itself with the rule framework and provides a configuration and an evaluation interface. This can allow plugging in as many condition types as necessary in future.

In one embodiment, rules can be broadly classified into the following two categories: SLA Rules and Inline Rules. SLA Rules are primarily used to evaluate SLAs and trigger alerts to catch potential system failures ahead of time. This can be done by aggregating monitoring information from all of the service proxies at regular intervals and checking the generated stats to ensure that all performance constraints are met. Inline Rules are useful because there is a requirement to support use-cases that require rules to be triggered inline (mostly from the error pipeline) as the pipeline executes, without the delay of monitoring data aggregation. For e.g., "Notify the customer the message originated from about a security credential mismatch". In this case, the contact information for the customer needs to be looked up from the Identity Management module. This requires a mechanism to embed rule "trigger points" inside of pipelines and allow business identityes to associate rules with these triggers at runtime. Such rules also require some minimal amount of runtime context data to be passed to the actions (current identity profile, current message, etc.).

Rules can be constructed via the management console. Each rule is associated with a single specific "entity" (service, stage, resource etc.). A rule schema can define the format of each rule. In one embodiment, a rule builder presents a front-end for users to construct a rule by tying together all the elements required to construct a rule. This involves specifying a rule name and a binding—the entity (service, stage, JMS resource etc.) to which the rule is bound. Selecting a service implies that the rule can be constructed using the monitoring elements available in the pipelines, routers and transports. In one embodiment, the binding provides a "context" for the rule in terms of clearly identifying what runtime data, if any, is available to the rule.

In one embodiment, a rule's trigger can be specified: a rule can trigger actions once and await manual reset or condition automatically resets; a rule triggers actions every time rule evaluates to true; and a rule triggers actions every 'x' minutes if the rule evaluates to true, etc.

In one embodiment, a rule can include zero or more conditions. Conditions can be of different types: Business Calendar, Monitoring Data, Runtime Context Variables and so on. The rule framework is designed to easily plug in new condition types from a runtime perspective.

Depending on the entity to which the rule is bound the rule builder user interface can allow specific condition types to be included in the rule. For example, SLA rules can be defined on the monitoring data that is available at that specific binding. Rules associated with JMS resources can include conditions based on the JMS resource metrics defined by the server. However, there can be certain condition types like Business Calendars that can associated with rules deployed to all binding points. This is because calendars don't depend on any specific context/binding related data. Each condition is comprised of one or more expressions that can be arbitrarily joined and nested using the OR & AND operators. For example consider the following rule:

If "Between 9 am and 5 pm" the "average_response_time of service ABC exceeds 2 seconds OR the security_violation_count exceeds 25" then Notify me via e-mail "once, until manually reset or condition automatically clears".

In the above rule, there are two condition types—Business Calendar and Monitoring Data. The monitoring data based conditions are logically OR'ed. For the above rule to be true, the current system time has be between 9 am and 5 pm AND either the average_response_time can exceed 2 seconds OR the security violations can exceed 25. Conditions are all AND'ed at the top level. Individual conditions consist of expressions that can be arbitrarily combined and nested (using Ors & ANDs).

In one embodiment, a list of actions can accompany a rule which specifies actions that need to be executed when the rule evaluates to true. The user may choose not include any actions in the rule. In one embodiment, a rule has at least one condition OR one action. Users can be asked to specify all the necessary configuration parameters necessary to execute the action. In one embodiment, actions can vary from simple tasks like sending out a notification email to invoking a remote web service to log a trouble ticket that gets routed to a specific worklist. The following are a few of the actions that can be available in the Service bus alerting framework: notify via email; invoke a web service; and set Service Cost—sets the "cost" of a service in the service directory. The cost of a service can be used to make routing decisions.

In one embodiment, the rule evaluator evaluates rules when triggered by an event. This can be via direct API invocation—The Rule Evaluator provides API methods that can be used to trigger rule evaluation. The method invocation parameters can contain information to identify one or more rules that need to be evaluated. For example, the Monitoring Data Aggregator, can invoke the rule evaluator API to evaluate SLA rules associated with a service when new monitoring data becomes available for that service. Rule evaluation can also be triggered by event subscription—the evaluator could subscribe to an event mechanism and trigger rule evaluation when an event is raised. The event context can contain all the runtime information that could be used in rule evaluation and action execution. A security stage raising a security-violation event could trigger rule evaluation to notify an administrator. In this example, the event context could contain the messageID and the sender's address that can help the admin clearly identify the source of the problem. Timer based rules could be triggered via a business calendar according to a pre-determined schedule. In one embodiment, a scheduling service could generate timer events that rule evaluator is subscribed to and kick-off the rule evaluation process when the event is raised.

In one embodiment, a framework to aggregate data that can be used to monitor the health of the system. The important features of this framework include: Allow users to easily embed performance monitor applications into service bus services via configuration; provide a mechanism to disable/enable monitoring at runtime; aggregate data and compute alerts to notify users of potential system failures; and provide basic metrics (e.g., minimum, maximum, average etc.) on the aggregated data.

In one embodiment, the monitoring framework can define a list of monitoring elements. Monitoring elements are a specific category of a monitoring metric. Monitoring elements are generic enough so they can be used by a wide variety of components. The list of monitoring elements can be extensible and more such elements can be added as required. In one embodiment, the framework can currently define the following monitoring elements:

Counters: provide a mechanism for users to define and use counters to keep track of things like number of requests processed, number of error, number of messages processed etc. Counters can provide methods to increment, decrement and reset the current value of the counter.

Timers: applications can use timers to time specific operations. A timer can provide methods to start, stop, reset and check the amount of elapsed time since the timer was started.

Figure 9:
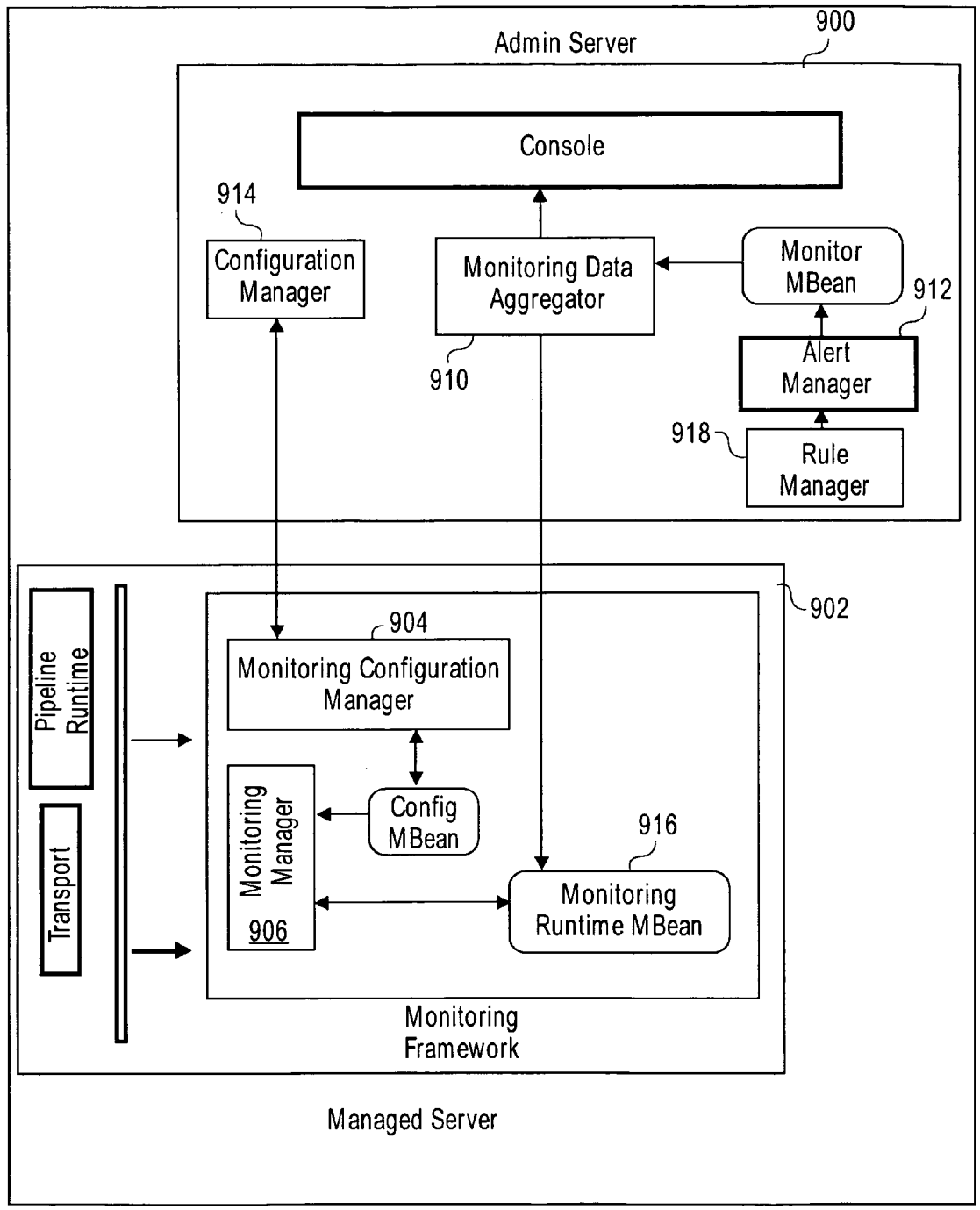
FIG. 9 is an illustration of monitoring components in accordance with an embodiment.

FIG. 9 is an illustration of monitoring components in accordance with an embodiment. A configuration manager 914 on admin server 900 captures the configuration information necessary for the monitoring framework. For example, this can include a list of monitoring attributes for each application, the data type of each attribute, whether monitoring is enabled, the frequency at which monitoring data needs to be aggregated for each application, etc. If external applications are interested in monitoring data they can also register with the configuration manager. In one embodiment, monitoring managers 906 run on service bus segment 902. In one embodiment, the monitoring manager can be exposed through Management Interfaces 916 externally and through a factory internally. Their primary functionality is to manage the monitored information on each managed server. APIs can also be provided so that applications can invoke monitoring functions for their data attributes.

In one embodiment, a data aggregator 910 runs on an admin servers at regular intervals (configurable) and aggregates data from all the information from service bus segments in a given domain. The aggregated data are processed and classified into specific time intervals as specified in the configuration of each application. The console can display monitoring information uses the aggregated data. At regular interval the monitoring data publisher (not shown) publishes data to registered external applications for the purpose of archiving or external computing. A rule manager 918 is charged of storing rules and evaluates rules using the aggregated data. In one embodiment, when a rule is evaluated to true it calls the alert manager 912. The alert manager notifies other processes when a rule is evaluated to true. For example, it can send an email and/or post a message on a queue according to the action associated with the rule.

In one embodiment and by way of illustration, the data aggregator 910 keeps less and less data in memory as the data get older. Windows can be defined to view the data with different precisions on different periods of time. For example, we define the following windows: 5 min, 1 h, 24 h. For a counter it means we are going to store for the last 5 min the all variations (may change that and decide to get variations by second for example or by 10 seconds). For the last hour the variations by 5 min. For the last 24 h the variations by hour. For any larger period the variation by day (implicit). With this configuration it means we need to store in memory an undetermined number of value for the last 5 min, +12 values for the last hour, +24 values for the last day and +1 value by day. So, for 365 days:~=400 values. The aggregated data can be displayed in graphs on the console and/or used to trigger rules.

In one embodiment, the user can interactively specify rules in the console. For example, the console can display a tree of monitored variables organized by services/stages/transport/quality of service which can be dragged and dropped inside an XQuery expression for the rule. Functions can also be dragged and dropped into the XQuery expression.

In one embodiment, applications that want to use the monitoring framework to capture monitoring data can specify the list of attributes that need to be monitored and optionally specify a sliding window of time and the frequency of updates within that window to capture data. When a sliding window and an interval within that window are specified, the system can also be configured to maintain "Recent Activity Window", which is a list of all monitoring entries that were made in the most recent time interval that is configured. In one embodiment, the system supports monitoring using counters and timers.

In one embodiment, the configuration information defines the list of attributes that each application is monitoring. Every application (or application instance, as in the case of transports) can register itself with the monitoring framework. Registration can involve providing a unique name and a list of attributes (and the corresponding data types) that can be monitored and time window specifications. The framework can publish a schema for the configuration.

In one embodiment, an admin server includes all of the runtime functionality provided by the framework. On an admin server this can include: aggregating data from all the managed servers; triage the data into respective time interval windows; compute statistics on the aggregated data; define an Management interface to provide access to the aggregated data; notify the Alert Manager of changes in data so rules can be triggered (or evaluate rules at regular interval); and provide a mechanism to publish monitoring data to external archival systems. On a service bus segment, the monitoring manager can: defines APIs for applications to record monitoring data; provide a runtime store for data; and expose its data through Management Interfaces.

In one embodiment, in order to log monitoring values, applications (e.g., transport, pipeline stage) need to first retrieve a monitoring context for the respective application by passing in a unique application name. The monitoring context provides access to named counters and timers that provide methods to log data. For example, sample source code can look like this:

ctx.getMonitoringService( ).getTimer("execution_time"). start( );

ctx.getMonitoringService( ).getCounter("nb_messages"). increment ( );

ctx.getMonitoringService( ).getTimer("execution_time"). stop( );

An admin server includes a data aggregator 910 which polls each service bus segment on a specific polling interval and aggregates data. The aggregated data is sorted and binned into memory storage bins organized by application name and the respective time windows configured. Statistics are then computed on the updated data. A Monitoring Runtime Management Interface 916 can allow applications to access this aggregated data. In addition, an admin server can notify the rule manager 918 so the rules can be run against the updated data and/or publish data.

If the condition of a rule is true the associated action(s) can be performed. In one embodiment, an action can be implemented as a service. In one embodiment, rules can be evaluated periodically at a user-specified interval. In one embodiment, alerts are implemented as services deployed on the service bus. The framework provides a configuration mechanism from which external applications can choose to have the aggregated monitoring data published to them on a specific JMS topic.

In one embodiment, a rule is a statement that evaluates one or more expressions and yields a Boolean result. In a further embodiment, a rule also has a list of associated actions that are executed if the result of evaluating ALL the conditions included in the rule results in a value of "true". Examples of conditions that could be included in a rule are: current time of the day (a business Calendar); current identity profile; application response times (or other monitoring data); and a security violation encountered by an application. Examples of actions that could be included in a rule are: notify an email address; send a message; create a new task entry; invoke a service; and enable/disable a service.

Rule examples:
A simple action—send a notification to administrator when the average response time of a particular service exceeds a certain threshold.
Between 9 am and 5 pm, everyday, raise an alert if more than 10 security violations are encountered in a 5 minute interval.
Log an entry if a message of type X was detected more than 10 times in the last 10 minutes.
If a process instance of type P has been "RUNNING" for longer than 12 hours, create a Worklist task entry.

Figure 10:
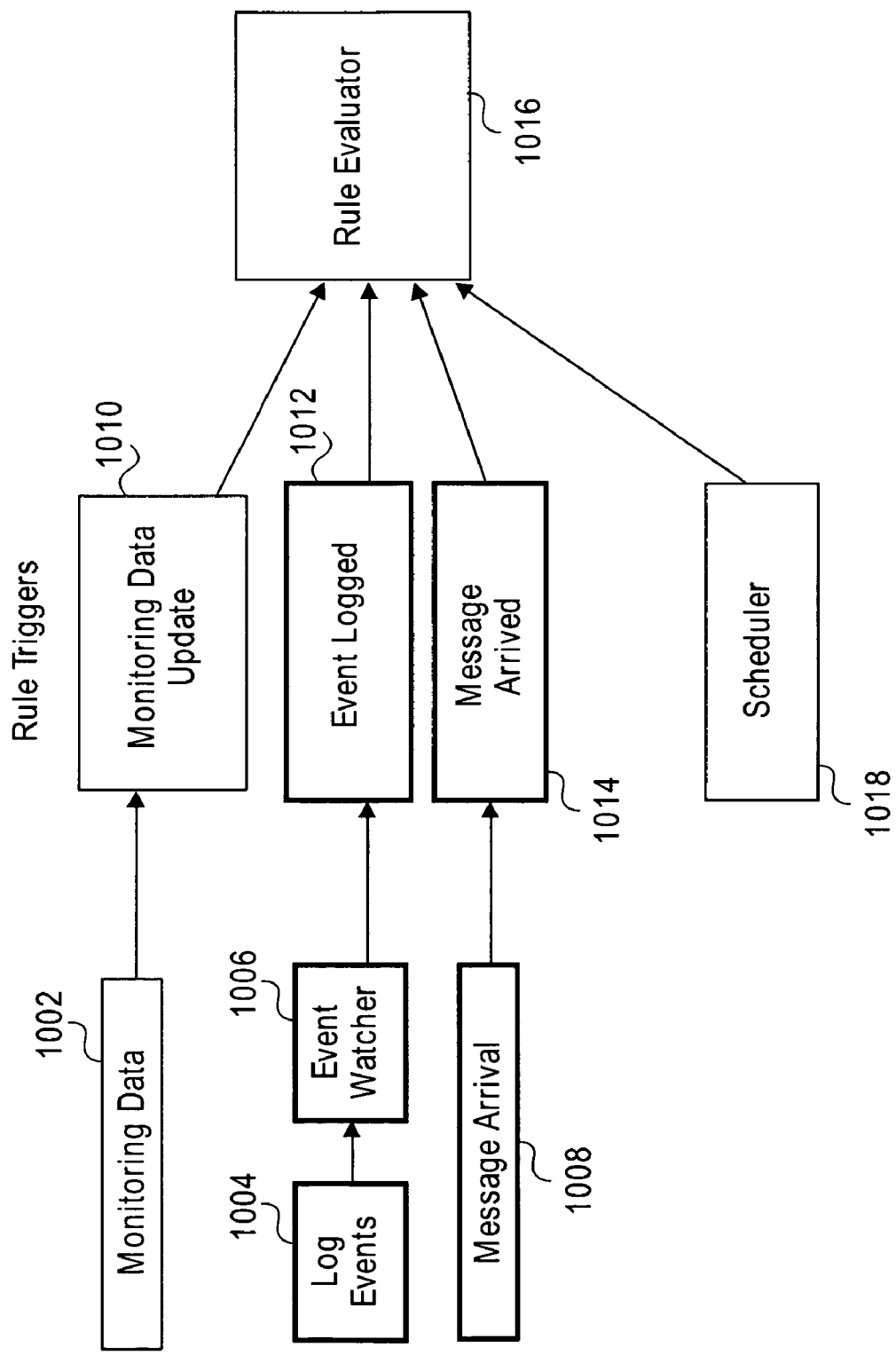
FIG. 10 is an illustration of rule triggering mechanisms in accordance with an embodiment.

In one embodiment, rules can be expressed in several different ways—natural language, XQuery statements, etc. The console can allow users to administer rules. The underlying rules can be persisted as XML documents and the schema for this XML can be published. In one embodiment, the rule framework runtime can consume this XML document and evaluate the rules at runtime. The XML document can be converted to an appropriate runtime format when evaluating these rules. Monitoring metrics based conditions, for example, can be evaluated as an XQuery. By way of a non-limiting illustration and with reference to FIG. 10, rule triggers can be of various kinds: availability of updated monitoring metrics 1010; an event 1012; a process transitioning from one state to another; a change in the average response time of a service; arrival a message of a certain type 1012; and a scheduling service 1018 that triggers a rule periodically.

In one embodiment, a rule context encapsulates the runtime data that is consumed by the rule when evaluating conditions and actions included in the rule. A rule context is very closely associated with a rule trigger. The runtime data contained in the rule context depends on the type of the trigger.

For example, a rule context generated by a trigger associated with the change in the average response time of a service can contain the name of the service and the new value of the average response time. A rule context based on an event trigger can contain the nature of the event and data associated with that specific event.

Rules can be defined and associated with various entities. In one embodiment, rule binding captures information about the entity that a rule is associated with. The rule binding influences the rule context in terms of clearly defining what, if any, runtime data is available to the rule. Each such entity with which a rule is associated can provide the rule with a set of data that can be used to build conditions and actions. For example, an SLA rule bound to a service proxy can include conditions based on the monitoring metrics available for that service.

As earlier mentioned, a rule can include a list of conditions and a list of actions. Each rule can have the following structure:

If <set of conditions> then <perform a set of Actions>

A rule can include zero or more conditions. In one embodiment, rules that do not include and conditions are always true and the action is executed each time the rule is triggered. Conditions can be of different types: Business Calendar, Monitoring Data, Identity Profile and other suitable types. The framework is designed such that new condition types can be easily plugged in at runtime to accommodate new condition types desired by customers.

In one embodiment, the types of conditions that can be included in the rule are dictated by the rule binding. An exception to this statement are conditions like a business calendar, which can be associated with all rules since a business calendar definition is "global" and not tied to any particular binding point. Each condition comprises of one or more expressions that can be arbitrarily combined and nested using logical OR and logical AND operators. In one embodiment, conditions are all AND'ed at the top-level. All the conditions included in a rule need to evaluate to "true" for a rule to evaluate to true. Just as new condition types can be added to the rule framework at runtime, new action types can be registered at runtime as well. In one embodiment, the alert framework can define an SPI that allows for the addition of new actions and conditions.

A rule trigger is responsible for kicking-off the process of evaluating of a rule. As mentioned above, the rule evaluation process can be triggered by several different mechanisms. In one embodiment and by way of illustration, these mechanisms can include: availability of updated monitoring metrics; event subscription—the rule evaluator could subscribe to an event framework and trigger rule evaluation when an event is raised; and timer based rules—a scheduling service could generate timer events that the rule evaluator is subscribed to and kick-off rule evaluation at fixed intervals.

In one embodiment, evaluating a rule involves evaluating each of the conditions included in the rule and if all of the conditions evaluate to true, the included actions are invoked. By way of illustration, the rule evaluator walks through each condition included in the rule and invokes the corresponding evaluator associated with each condition type to evaluate the condition. In a further embodiment, each condition type registers an evaluator that can evaluate conditions of that type. Registering a condition evaluator involves implementing a Java® interface published by the alert framework.

In one embodiment, the rule framework provides a service provider interface (SPI) through which additional condition and action types can be registered. In one embodiment, each action and condition type is implemented as a separate web-application. When the application is deployed, a listener class registers these condition and action types.

In one embodiment, a rule binding identifies a location with which rules can be associated. Each service (both external and proxy) can define one or more binding points to which rules can be deployed. A binding point can capture the monitoring metrics registered by all the pipelines, stages and transports in that service proxy. Rules can be bound to this binding point and monitoring metrics available at this binding point can be used to construct conditions. In one embodiment, a listener registered with the configuration manager is notified each time a service proxy created/updated/deleted. This listener can extract the binding points in the service and register them with an alert binding manager.

In one embodiment, every "entity" (service or process) that contains a rule binding point can register these binding points with the Alert Manager when the entity comes into "existence". For Service bus services, this means that the binding points are registered when a service is created. For BPM processes, this registration happens when the process is deployed. In one embodiment, this repository of binding points can be persisted and can be available for browsing via a JMX interface that the console and other tools can use.

In one embodiment, the Alert Manager can provide an API that takes the service/process name and a rule context that contains the new monitoring metrics. The alert manager can then look up all the binding points registered for that service or process and evaluate all the rules bound to each binding point.

In one embodiment, in addition to all the information populated at configuration time, the rule context can include all the runtime data generated by the rule binding. Condition and action evaluators can extract this runtime data and embed the corresponding values in the alerts generated. The following table lists fields that can be available in a rule context:

TABLE 1

Runtime Rule Data in accordance with an Embodiment

| FIELD NAME | DESCRIPTION | DATA TYPE |
| --- | --- | --- |
| Rule Name | The name of the rule that is currently executing. | String |
| Binding Point Name | The name of the binding point that the rule is bound to. | String |
| Entity Bound To | The name of the entity with which the binding point is associated. | String |
| Entity Type | The type of the "Entity Bound To". | Enum |
| Entity URL | The display URL of the entity. | URI |
| Data Elements | A list of monitoring data elements and the runtime values for the elements at the associated binding point. | List (e.g., represented as an XML document) |

In one embodiment, the rule framework can expose a set of Management APIs to configure rules. These APIs can provide insertion, retrieval, validation and persistence functionality to administer rules. This can allow third-party tools to directly interact with the Management layer to administer rules and completely by-pass the administration console.

Multiple rules can be associated with a single binding point. Rules can be executed in the order in which they were deployed. Users can change this order at any time. In one embodiment, creating a rule involves associating a rule with a binding point. For example, two ways of doing this:

1. Browsing Binding Points—The administrator first browses all of the binding points from the binding repository, selects one and creates a rule associated with that binding point.

2. Browsing Entities—In this case, the administrator starts by first identifying the entity (Service bus service directory or BPM process viewer) with which he/she wants to associate an rule. The user is then presented a list of rule binding points available in the service/process and selects one of the binding points and creates a rule that is associated with that binding point.

In one embodiment, each rule condition and action type can define its own schema to represent the action or condition configuration data. This condition or action configuration is returned to the alert manager as serialized XML and the alert manager can persist this data as part of the rule definition. The rule context is passed to each condition and action type when configuring the condition or action. This allows the condition configuration mechanism to perform validation to ensure that the monitoring data elements available at that binding point are included in the condition configuration.

In one embodiment, rules deployed to a particular binding point can include monitoring data elements available at the specific binding point. For users that use the administration console to administer rules, this validation can be automatically performed by the console. The console can easily ensure that the data elements available at the associated binding are used to construct conditions and actions included in the rule.

In one embodiment, a Monitoring Manager aggregates metrics for monitoring data and triggers the evaluation of rules associated with each binding point for each service/process that has updated monitoring metrics available. Across a collection of service bus segments the Alert Manager can first construct a rule context for the specific binding point. Then, all the rules deployed to that binding point can be fetched and each one can be evaluated in the order in which the rules are configured. The rule context is passed to each condition and action evaluator. If all the conditions in the rule evaluate to true, the actions included in the rule are executed. A rule runtime state object keeps track of the result of firing each condition and action. This information is used to ensure that alerts are not fired repeatedly for a pre-existing condition that the user has already been notified of.

In one embodiment, the rule runtime state object is passed to each action and condition as well. This object can also define placeholder for each condition and action to place record data which can be used to generate a tracking record for each rule evaluated. An alert log entry is generated as a tracking data element that can be included in either a data set. Tracking records can be displayed on the console.

In one embodiment, a routing node provides request/response communication for a message processing graph. It is used to dispatch a message to a selected service and, if applicable, wait for a response. Since in one embodiment routing is considered part of the primary message-path of the service proxy, any received response can used as the response message in response processing. In one embodiment, a routing node includes of a set of routes. A route identifies a target service (e.g., a service proxy or an external proxy) and includes some additional configuration options that determines how the message can be packaged and sent to that service. Outbound transformation is a set of transformation actions that allow the message and context to be modified before it is sent to the target service. Response transformation is similarly a set of transformation actions that are applied to the received response. In aspects of these embodiments, route selection is made conditional by any combination of if-then-else blocks and routing tables.

When configuring a route, there is also the option to specify the special route called skip. It is simply a route that does nothing—effectively a non-route. Skip behaves like a route in that it can be selected and can prevent any subsequent routes from being considered or selected. However, no messages can be sent and no responses can be expected with a skip route. The skip route has no further configuration. The purpose of skip is to allow users the option of explicitly defining the case when they do not want to route.

In one embodiment, an outbound transformation is used to customize the shape of the message that can be sent to the target service. This potentially involves modifying the message itself (e.g. payload, SOAP headers) as well as transport-specific details such as transport headers, retry counts, alternate URI, etc. This can be done using the standard set of transformation actions currently exposed in the transformation stage. In addition to assign, update and delete, outbound and response transformations can also be able to use conditions, WS-Callout and raise errors.

In one embodiment, a response transformation is used to customize the shape of the response message before it is turned over to the pipeline for response-path processing. The intention here is that outbound and response transformations can be used together to effectively translate between the request/response format used by the service proxy and the request/response format used by the target service. The response transformation can also be used to check for message-level faults such as a SOAP or business fault. If a message fault is detected, it could raise an error condition, just like a regular transformation stage.

In one embodiment, to perform conditional routing, routes may be wrapped in if-then-else blocks. The conditions can be any Boolean-valued XQuery expression and blocks can be arbitrarily nested. In a further embodiment, the final action is a route or a routing table. In one embodiment, a routing table includes a set of routes wrapped in a switch-style condition table. It is a short-hand construct that allows different routes to be selected based upon the results of a single XQuery expression.

In one embodiment, a routing table consists of a single where clause and a set of one or more cases. The where clause contains an XQuery expression and may reference any part of the message context. Each case consists of a comparison operator, a value expression and at least one route serving as the case-action. Since the entire routing node can result in one route being selected, multiple routes per case are not supported. A default case can be added at the end whose route is selected if none of the preceding cases is satisfied.

An example routing table is shown below, although it does not necessarily represent how the table can presented in the configuration console. Route details are also omitted for clarity.

| comparator | value | routes |
| --- | --- | --- |
| >= | 100000 | GoldService route |
| >= | 10000 | SilverService route |
| otherwise | | StandardService route |

The routing table supports several different comparison operators in addition to equality. Furthermore, the value expression in a routing table is an XQuery expression and need not be a simple constant value. In aspects of these embodiments, the routing table is evaluated by first evaluating the XQuery expression in the where clause. Each case is then examined in the order listed by using the selected comparison operator to compare the where clause result with that of the case's value expression. If the comparison is satisfied, then the corresponding route(s) can be selected.

In one embodiment, message dispatch is performed as part of the routing node's runtime. The basic execution flow is that first the conditions and routing tables are evaluated to see if a route is selected. If a route is not selected, then the routing node is considered complete and response processing begins immediately with the current state of the Message Context. If a route is selected, any corresponding outbound transformation is then applied to the context. The message is then sent to the service by way of the binding and transport layers. If no response message is expected, then the routing node is considered finished and response processing begins. Otherwise, the routing node is still considered active until the response arrives. Once that occurs, the response transformation is applied and the routing node is considered finished.

In one embodiment, a batch update feature allows changes to service bus components to be made in a "session" where they are accumulated and can be applied together. By way of illustration, the user (via the console) or process creates a special "batch session" where the changes are going to be accumulated. The changes made in the batch session are not saved to the "core state", but rather, they are saved in the session. Changes can be reviewed before "committing" them. In one embodiment, it may not be possible to commit the changes right away. For example, committing is not allowed if doing so would result in an invalid "core state" (e.g., if it creates cycles, causes unresolved references, etc). Assuming the batch session can be committed, the changes are accumulated are reflected to the core state.

In one embodiment, a batch session keeps track of what components are deleted, created, or updated in the session data. This data is persisted so that it survives service bus restarts and crashes. The core state is the main configuration which the server bus is running on. Changes that are made within a session are reflected to the core state when the session is committed. Core state ultimately defines the behavior of the service bus. A session view is the state of the configuration as observed by someone in a session. Session view is not a physical data entry. It is derived by taking the core state, and applying the session data to. Batch update is the activity of modifying the service bus configuration in a session, and then committing these updates.

In one embodiment, a batch Session (or simply session) is the centerpiece of batch update support in the service bus. Sessions are created by users and/or processes. Any number of sessions can be created simultaneously. Each session can have a different view of the system determined by the modifications performed in that session. Session data is persistent and can survive crashes or restarts. A session keeps track of what components are updated, created and deleted by the user. This is called the session data. The session data together with the with the core state defines the session view, e.g., what components are visible, and what value they contain, in that session.

In one embodiment, a session is created by invoking a method on a Session Manager via a Management Interface. A session can be created by any process using the Session Management Interface, or it can be created in the console. Configuration changes (updates, deletes, creates) can be performed within a session. The service bus Management Interface methods that update configuration can be modified to accept a session name, e.g.:

public void createService(String session, Ref serviceref, ServiceDef definition);

External clients that use Management Interface only have to supply the session name, and the updates performed by that method can be accumulated in that session. It is possible that a client performs multiple updates all in different sessions. In the following example the Java code updates a service in session1 and deletes a service provider in session2. These two sessions can have a different idea of what the configuration looks like. Session1 can think that the service provider still exists, and session2 can think that the service has the old configuration.

servicemgmt.updateService("session1", service1, newServiceData);
    serviceprovidermgr.deleteProvider("session2", serviceprovider2);

In one embodiment, a console user enters a session when he creates a new session, or when he picks an existing session to work in. The same user can switch between different sessions, and different users can work on different sessions simultaneously. The view of the configuration as seen by a session differs from that of others, and the core state. If a user creates service A, deletes service B, and subsequently requests a list of services he should see that A is in the list, and B is not. The actual configuration (core state), however, cannot have A, but can have B until the session is committed.

In one embodiment, the Management Interface read methods (such as getters, list methods, search methods) can accept an optional session parameter. If the session parameter is null the data can be obtained from the core state. If the session parameter is not null, then a view of the configuration as seen by the session is returned. For example, lets assume that the core state contains services B and C. Further assume the user creates a session, S1, and creates service A, and then deletes service B in this session, but does not commit these changes just yet. The listServices(String session) method can return different results depending on the session:

listServices(null) returns B and C
    listServices("S1") returns A and C

The console user sees the core state if he is not in any session. Once the user is satisfied with his changes he can commit the changes, subject to validation. Committing applies the changes he has made in the session to the core state. Once a session is committed it is deleted, since it is no longer usable. The user can also discard a session. This simply deletes the session data state, and has no impact on the core state. The user can leave the session he is currently in without committing or discarding it. Doing so allows him to see the core state, or switch to another session.

Figure 11A:
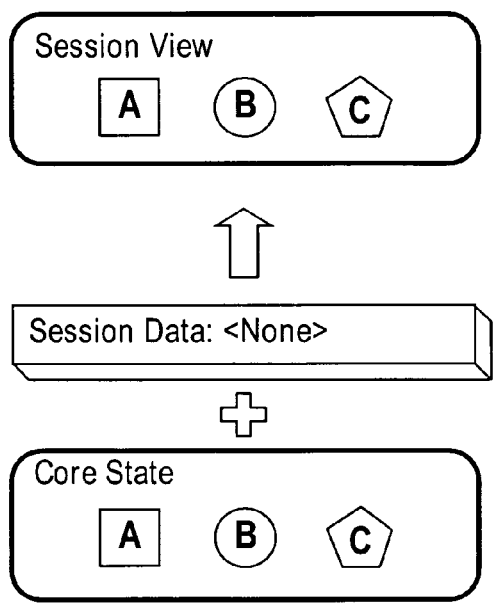
FIG. 11a illustrates an initial core state that contains components A, B, and C in accordance with an embodiment.
Figure 11B:
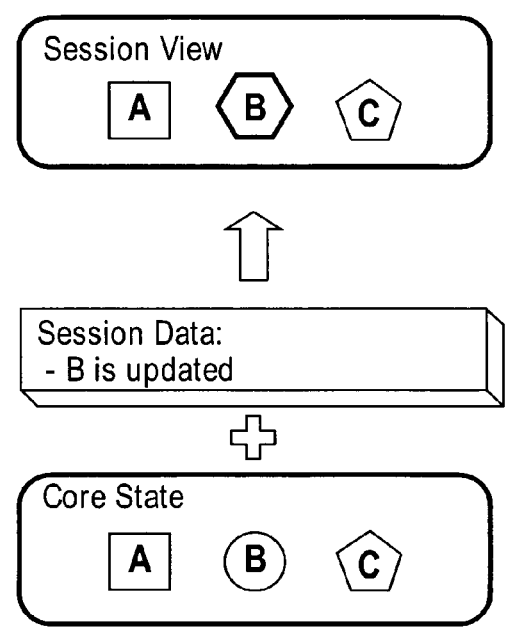
FIG. 11b illustrates an update in session data in accordance with an embodiment.

FIGS. 11a-b illustrate the core state, the session data, and session view after various modifications are performed in a session and in a core in accordance with an embodiment. Different geometrical shapes are used to highlight different values taken on by the components. The shapes with thick lines in the session view indicate that, that component was modified by the session and thus its existence and value differs from the same component in the core state. Shapes with regular lines in the session view indicate that, that component was never modified in the session and thus its existence and value is obtained from the core state.

FIG. 11a illustrates an initial core state that contains components A, B, and C. There has not been any updates in the session, so the session view reflects exactly what is contained in the core state. FIG. 11b illustrates an update in the session data. Component B is updated in the session. This fact is recorded in the session data, and the session data is in turn used together with core state to compute the session view.

Figure 12A:
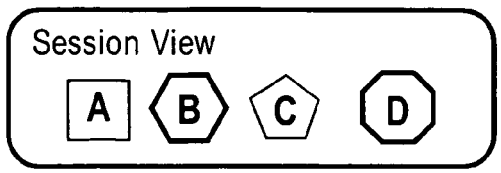
FIGS. 12a-c illustrates additional session scenarios in accordance with an embodiment.
Figure 12A:
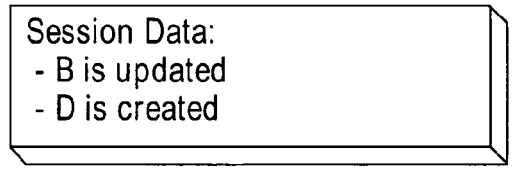
Figure 12A:
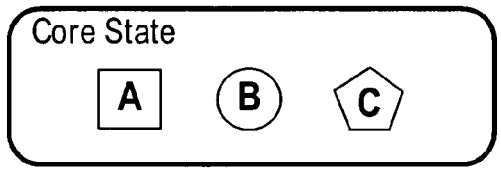
Figure 12B:
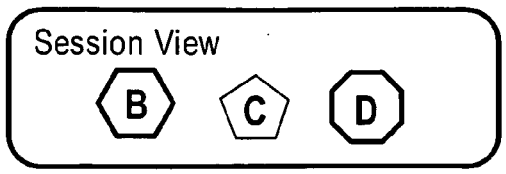
Figure 12B:
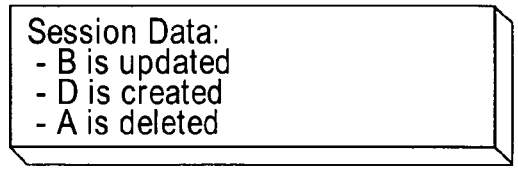
Figure 12B:
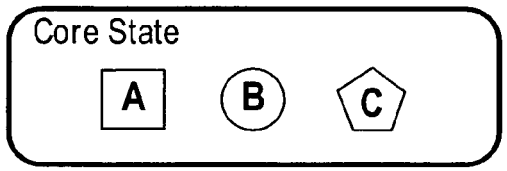
Figure 12C:
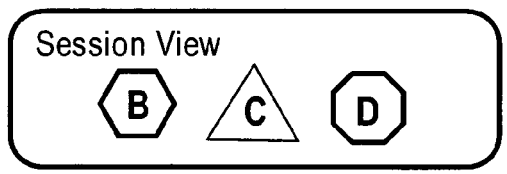
Figure 12C:
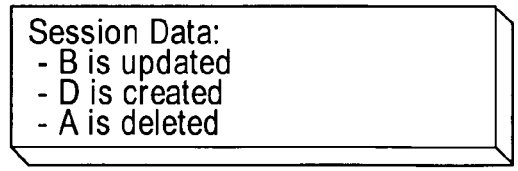
Figure 12C:
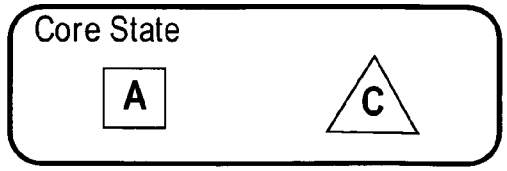

FIGS. 12a-c illustrate additional session scenarios in accordance with an embodiment. In FIG. 12a, component D is created in the session. Notice that although D is visible in the session view, it is not visible in core state. In FIG. 12b, component A is deleted in the session therefore the session view no longer contains component A. A user that is not in any session however sees the core state and observes that component A exists in the core state. Finally, FIG. 12c illustrates the core state and the session view after two modifications are done in the core state (possibly due to committing another session): Component B is deleted and C is updated. These two changes manifest themselves differently in the session view. The update to C is visible in the session view, since C was never modified by the session. The deletion of B, however is not visible in the session, because B was modified by the session, hence, its value is obtained directly from the session data. This case is an example of a "conflict" between a session's data/view and the core state. Such scenarios arise if the same item is modified incompatibly by two sessions. Unless one of the sessions is discarded, conflicts can be resolved when the second session is committed.

In one embodiment, session data is essentially a list of records (information) for all the components that are modified (created, updated, or deleted) in that session. There is exactly one record for each such component even if it is modified many times in that session (e.g., it is created, then deleted, then created again). This record is created the first time a component is updated by the session. It is updated as further modifications are performed on the same component. The record is removed if all the updates that are performed by the session on that component are undone. Session data is persisted on the file system. Notice, also that, the session data is not a snapshot of the configuration data as of the time session was create (the server uses snapshot based session data In one embodiment, the following provides logic for Create, Update and Delete operations.

1) Create A in Session S:
a) if A was deleted in session then CREATE (update the existing session data for A)
b) else if A exists in session data then ERROR (cannot recreate)
c) else if A exists in core state then ERROR (cannot recreate)
d) otherwise CREATE (create a new record for A in session data)

2) Update A in Session S:
a) If A is deleted in session then ERROR (A does not exist in session)
b) else if A exists in session data then UPDATE (update the existing session data for A)
c) else if A exists in core then UPDATE (create a new record for A in session data)
d) else ERROR (A does not exist in core state)

3) Delete A in Session S:
a) If A is deleted in session then ERROR (A does not exist in session)
b) else if A exists in session data then DELETE after proper referential integrity checks.
c) else if A exists in core state then DELETE after proper referential integrity checks.
d) else ERROR (does not exist in core state)

In one embodiment, read operations give the illusion that the user is seeing the session view (rather than the core state). They do it by using the session data and the core state. The following logic describes the implementation of a Read (get) operation in an embodiment:

1) Read A in Session S
a) if A is deleted in session then return null
b) else if A exists in session then return its value in this session
c) else if A exists in core state then return its value in core state
d) else return null In one embodiment, batch Sessions allow users to undo operations they have done in that session, in a strictly reverse chronological order.

In one embodiment, when a session is being committed the system can reflect the changes to the core state appropriately. The commit essentially result in a sequence of updates, deletes or creates to various components that are modified by the session. In one embodiment, the commit of a session can be atomic. In other words if it fails in the middle or if the service bus crashes, the changes made so far can be rolled back.

Figure 13A:
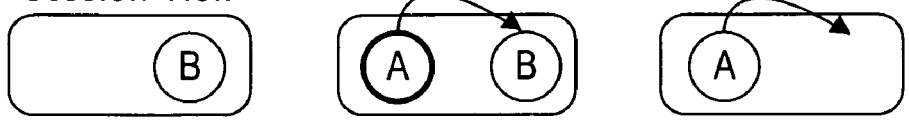
FIGS. 13a-c illustrates inconsistencies between a session view and a core state.
Figure 13A:
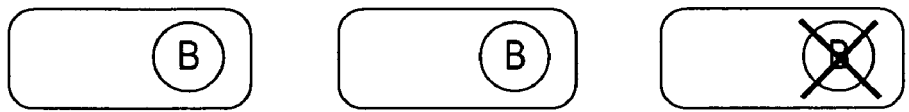

In one embodiment, a session can be committed if its commit will not result in an inconsistent core state. In one embodiment, a commit is not allowed if any one of the following is true:

1) Some of the components that are referenced by a component in the session are deleted in the core state. This is illustrated in FIG. 13a. Component is created and references component B that is already in the core state. Then B is deleted from the core state. Although the core state is valid, the session contains an invalid reference from A to B.

Figure 13B:
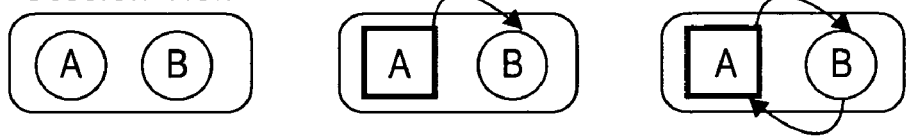
Figure 13B:
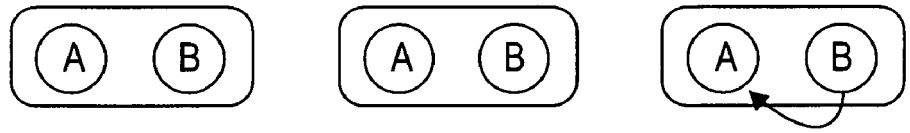

2) Changes to the core state may generate a cycle of references in the session view. This is illustrated in FIG. 13b. Committing such a session would introduce the cycle to the core state, and hence the commit is not allowed. A cycle is introduced in the following figure by first updating A so that it references B. Then B is modified in the core state to reference A. Although someone looking at the core state can see the reference from B to A, a user in the session can see both B referencing A and A referencing B.

Figure 13C:
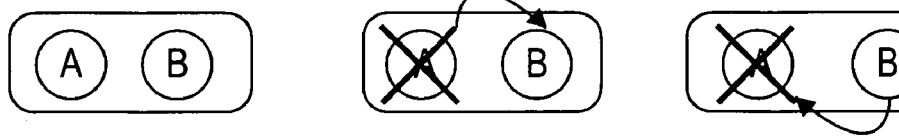
Figure 13C:
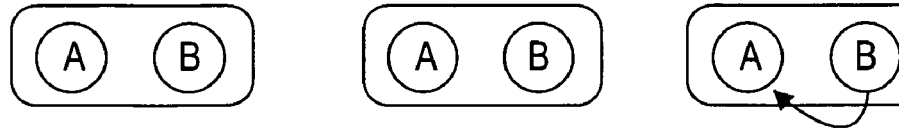

3) FIG. 13c illustrates Referential Integrity violations due to components that can be deleted. When a component is deleted in a session, the session manager checks to make sure that there are no references to that component. After the delete the component is no longer in session view. However since this component is visible to users outside the session because the session is not yet committed. It is possible that, a component in core state is modified to point to the component that is deleted by the session. Such a scenario means that the commit cannot be done because doing so would result in invalid references.

4) Conflicting modifications in session and core state. It is possible that the same component is modified in a session and also modified in the core state (due to the commit of another session). For example a session may delete a component, while the same component may be updated with a new value. Such conflicting updates can be resolved explicitly by the user. This issue is explored in more detail later in this document.

5) Conflicting the server change list in progress. Certain operations performed in a session result in modifications to the server. For example, creating a service usually deploys servlets or Mdatabases. These changes however require a the server lock, and need to be submitted in a change list (the server calls their sessions change lists). Unfortunately the server does not allow multiple change lists. If there is already a the server change list in progress, service bus can not be able to commit its own changes to the server.

Table 2 lists conflict scenarios and how the system can automatically resolve such conflicts in accordance with an embodiment. Notice that the table also lists three concurrent modification scenarios that do not lead to conflicts because the exact same modification done in both the session and the core state. The table has four columns. First column represents the original value of a component before it is modified. A NULL value in this column indicates the component did not exist original. The second and third column represents the value of the component in the core state and session respectively. A NULL value in these columns indicates that the component is deleted (or not created at all). The fourth column explains the conflict and describes how the conflict can be resolved. In one embodiment and with reference to Table 2, there are three ways conflicts can be resolved by the system, defined as ACCEPT SESSION, ACCEPT CORE, and, in the case of conflicting updates, MERGE.

TABLE 2

Conflict Resolutions in accordance with an Embodiment

| ORIGINAL VALUE | VALUE IN CORE STATE | VALUE IN SESSION | CONFLICT DESCRIPTION AND RESOLVING OPTIONS |
|---|---|---|---|
| \multicolumn{4}{c}{Conflicting concurrent modification scenarios} ||||
| V | Vc | Vs | Two conflicting updates: The user can resolve this conflict by doing one of the following: a) ACCEPT SESSION: Commit overwrites value in core with the value in session b) ACCEPT CORE: Commit preserves value in core state (effectively throwing away his changes) c) MERGE: merge the updates in both of them. |
| V | NULL | Vs | Update in session, delete in core state: Ways of resolving: a) ACCEPT SESSION: Commit re-creates the component in the core state with the value in the session. b) ACCEPT CORE: Commit keeps the component deleted (unless doing so results in RI violation) |
| V | Vs | NULL | Delete in session, update in core state: Ways of resolving: a) ACCEPT SESSION: Commit deletes the component in the core state b) ACCEPT CORE: Commit leaves the component in core state intact. |
| NULL | Vc | Vs | Two conflicting creates: Ways of resolving: a) ACCEPT SESSION: Commit uses the value in session b) ACCEPT CORE: Commit uses the value in core |
| NULL | Vc | NULL[i] | Conflicting create and create + delete: In this case the component is created in session and core state concurrently. However, the component is then deleted in session. Ways of resolving are: a) ACCEPT SESSION: Commit deletes the component in core b) ACCEPT CORE: Commit keeps the value in core state intact. |
| \multicolumn{4}{c}{Non-conflicting concurrent modification scenarios} ||||
| V | Vx | Vx | Two updates with same value |
| NULL | Vx | Vx | Two creates with the same value |
| V | NULL | NULL | Two deletes never conflict |

In one embodiment, an update plan is an object that describes what actions are to be performed by a server. A change manager that exists on each server is responsible for executing the actions described in the update plan. The Update Plan executed on an admin server may differ from that executed on a service bus segment.

This section gives a very high-level overview of how updates are performed. It is not meant to be a complete picture of updates and recovery.

In one embodiment, an update is initiated in the following cases:

User updates: The user commits a batch update. An update plan is generated and executed on admin and managed servers. These updates typically occur on admin server and on service bus segments.

Service bus segment recovery: A service bus segment finds, after a prolonged disconnection from an admin server, that its configuration data is out of data. It thus requests an update plan from the admin server, that can be executed on the service bus segment and can bring the configuration up-to-date. The updates are essentially the "deltas".

In the case of user updates, the update plan is first executed on admin server, and if it succeeds it is sent to service bus segments simultaneously (and asynchronously) for execution there. In the case of service bus segment recovery, the service bus segment first sends a digest of all resources that it knows about and their version numbers. The admin server then compares this with is own data and if there are any discrepancies it prepares and update plan that can be executed on the service bus segment.

In one embodiment, the update plan is sent to service bus segments using a well-known JMS topic specifically configured for service bus. Each segment as well as admin, has a change manager component that is responsible for receiving the plan, executing it and, reporting the result back to the admin server. Each segment as well as admin is responsible for executing the update plan it receives. If the plan execution fails due to an application failure (e.g., an exception, not a crash), it is responsible for rolling it back all the changes that are performed by the update plan, to the state of the configuration that existed prior to executing the update plan. In other words the execution of a plan is atomic. It either succeeds or fails. In either case the outcome is reported to an admin server.

It is possible that the updates succeed on some segments, but fail on others. When this happens the updates on the successful segments can be rolled back, or undone. A segment may crash during the execution of an update. When this happens it has to perform recovery during startup. In one embodiment and by way of illustration, recovery involves the following steps:

1) Rollback any local work that has been performed but not committed. Since there was a segment crash, persisted data (files) need to be recovered, and rolled back to their before-image.

2) Furthermore, if on a server bus segment:

a) Send a digest of the current contents of configuration to the admin server, and receive deltas.

b) Apply these deltas locally to bring the service bus segment configuration up-to-date with an admin server.

In one embodiment, an update plan describes changes that are needed to be applied to service bus configuration. An Update Plan is executed on admin server and service bus segment, and it contains a list of "tasks" that describe individual changes. In one embodiment, there are five types of tasks: Create component task; Update component task; Delete component task; Create folder or project task; and Delete folder or project task. In general the update plan first executes tasks to create folders or projects, followed by any number of component tasks, and ends with tasks to delete folders and projects.

In one embodiment, each task in the update plan provides the following functionality:

Validate: validate the data that is affected without making any modifications in the system.

Execute: once validated, execute simply performs the configuration change. Namely it creates, updates, and deletes stuff.

Figure 14:
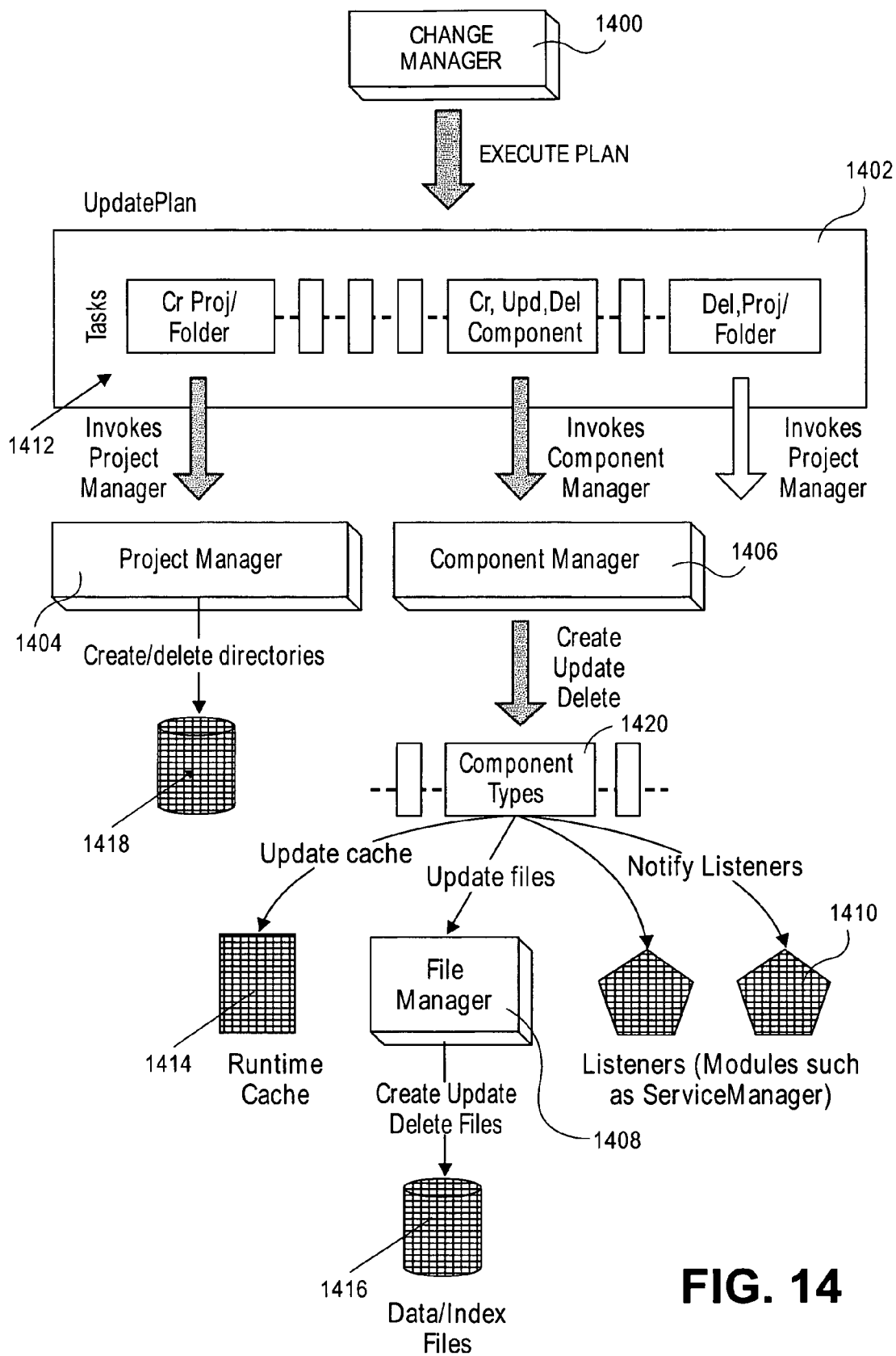
FIG. 14 is an illustration of update plan execution in accordance with an embodiment.

FIG. 14 is an illustration of update plan execution in accordance with an embodiment. This figure describes how an update plan 1402 is executed and what modules/subsystems are affected. This figure shows three major players that can participate in an update: various Managers in the configuration framework that specialize in certain things (1400, 1404, 1406, 1408); data structures, such as update plan, tasks, etc.; and various stateful entities (1410, 1414, 1416, 1418): These are various pieces that hold some state. These are runtime caches, persisted data, and other data that is kept by other modules in the system (such as XQuery manager which keeps a cache of compiled XQuery plans).

In one embodiment, an update begins when the Change Manager 1400 gets an Update Plan 1402 and executes it. In aspects of this embodiment, an update plan is simply a list of tasks 1412, which can be executed in order. These tasks invoke methods of Project Manager 1404 or Component Manager 1406 in order to update/create/delete/rename components 1420, folders or projects 1418. Project Manager and Component Manager in turn update relevant stateful entities, such as runtime caches 1414, reference graphs, and files 1416. In a further embodiment, file updates are handled via the File Manager.

In one embodiment, the various modules that listen to updates to component (for example Service Manager) 1410. These modules register for changes that occur on a particular component type, and are notified when an instance of that component type is created, delete, updated, or renamed. Listeners typically update their own internal state in response to these notifications. For example the transport manager deploys/un-deploys/suspends/resumes transport endpoints based on changes made to the definition of a service. These listeners hold state that can be rolled back when an error occurs.

In one embodiment, in order to facilitate proper recovery the change manager can persistently record the following facts about the execution of a plan:

1) At the beginning of plan execution, write a record on the disk that indicates the execution has started. A simple string value such as "STARTED" is enough.

2) After successful execution, write a record on the disk that indicates the execution has successfully finished. A simple string value such as "SUCCESS" is enough.

3) After application failure, write a record on the disk that indicates the execution has failed and recovery is in flight. A simple string value such as "FAILED" is enough.

In one embodiment, recovery is initiated after an application failure or a server crash. In the first case the update is stopped after the application failure and recovery is started immediately. In the second case the recovery is performed when restarted after a crash. Rollback means undoing the effects of an (group of) operation(s). Whereas recovery implies a more general activity that may involve many rollbacks, and potentially many other kinds of activities, such as exchange of data between different entities in a distributed environment, or potentially redo operations. Nevertheless these two terms can be used interchangeably.

Suppose some operation OP changes the value of piece of data (e.g., state) from $V_1$ to $V_2$. This operation can be rolled back in two ways: 1) Value based approach (physical rollback): Save V1 as the before-image for this operation, and then revert back to that value when rolling back; and 2) Operational approach (logical rollback): Apply the inverse of operation OP (call it $OP_R$) on the current value, $V_2$ to obtain $V_1$.

In one embodiment, both approaches can be employed depending on which stateful entity is being rolled back. For example it makes sense to use before-images (value based approach) for file updates. This allows crash recovery to simply replace all affected files with their before-images. On the other hand, in order to rollback state changes that are performed by various managers in response to notifications, we use operational approach.

Figure 15A:
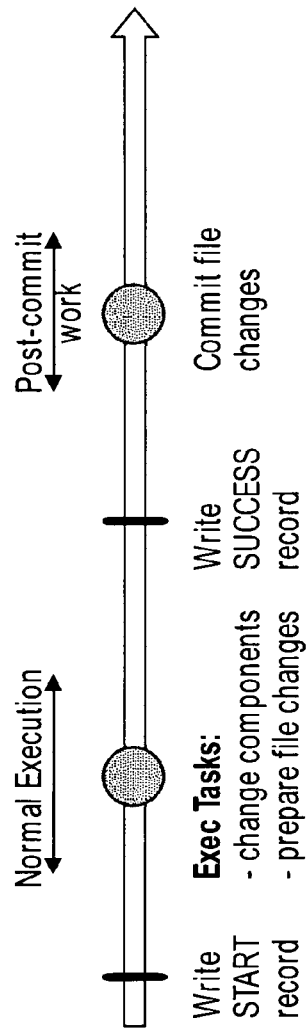
FIG. 15a is an illustration of a successful update in accordance with an embodiment.

FIG. 15a is an illustration of a successful update in accordance with an embodiment. In general it is possible that a segment or admin may crash during a rollback after an application exception, or may crash during recovery after a start. The filled circles indicate where the system may crash.

Figure 15B:
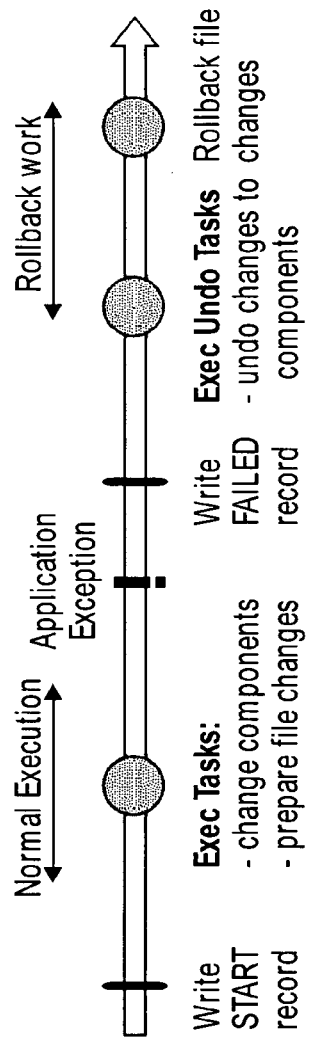
FIG. 15b illustrates failure of an update due to an application exception.

In FIG. 15b, execution fails due to an application exception and in one embodiment recovery starts immediately. Rolling back the execution of a plan relies mainly on the operational rollback approach.

In one embodiment, when a plan is executed it simply executes each of its tasks in a sequence. Before a task is executed an undo task is created for that task. Notice that this undo task is basically the inverse operation that can be used to rollback the effects of a task. In aspects of these embodiments, these undo tasks are accumulated in memory. When a task fails the plan execution stops and the accumulated undo tasks are executed in the reverse order. For example suppose the plan has three tasks, namely, update policy P, create service S, and delete XQuery X and deletion of XQuery fails. The following list enumerates what is executed:

1) Obtain undo task for Update Policy P. Lets call this UndoTask1.

2) Execute "Update Policy P". This succeeds.

3) Obtain undo task for Create Service S. Lets call this UndoTask2.

4) Execute "Create Service S". This succeeds

5) Obtain undo task for Delete XQuery X. Lets call this UndoTask3.

6) Execute "Delete XQuery X". This fails.

7) Rollback is started.

8) UndoTask3 is executed.

9) UndoTask2 is executed.

10) UndoTask1 is executed.

In one embodiment, the undo task for create and delete are delete and create tasks. For an update task, the undo task can be another update task that updates a component with its original value. Similarly for rename task, the undo task can be another rename task that renames the component back to its original name. The task framework also allows programmers to customize undo tasks.

In one embodiment, updating of files does not proceed in a do/undo style as the execution of tasks proceed. A task is executed, and in the case of rollback, its undo task is executed. With files a file update is first "prepared", and at the end of the whole plan execution, the update is either "committed" or "rolled back" based on whether the plan execution has succeeded. For example suppose configuration files F1, and F2 are to be updated/created/deleted as a result of some configuration change to components C1 and C2. The following happens:

1) Component C1 is changed. This causes the file F1 to be prepared with relevant data.

2) Component C2 is changed. This causes the file F2 to be prepared with relevant data.

3) If the whole plan execution succeeds (e.g., commits) then as a final step we do
 a) Commit updates to file F1
 b) Commit updates to file F2
4) . . . otherwise as part of rollback we do
 a) Rollback updates to F1
 b) Rollback updates to F2.

The following table gives how creation, update and deletion of a file proceeds in an embodiment. Columns named prepare, commit and rollback describe what happens in those phases. (These actions also apply to creation, or deletion of folders)

TABLE 3

File Operations in accordance with an Embodiment

| OPERATION | PREPARE | COMMIT | ROLLBACK |
| --- | --- | --- | --- |
| CreateFile(X) | Assert X does not exist create file X.new | Rename X.new → X | Delete X.new |
| UpdateFile(X) | rename X → X.old create file X.new | Delete X.old Rename X.new → X | Delete X.new Rename X.old → X |
| Delete File(X) | Rename X → X.old | Delete X.old | Rename X.old → X |
| RenameFile(X, Y) | Prepare as if Y is created and X is deleted | Commit as if Y is created and X is deleted | Rollback as if Y is created and X is deleted |

The commit and rollback operations for files are performed after the SUCCESS or FAILED record are persisted to the LAST_TRANSACTION_INFO file. This is a design decision that allows recovery after a crash during the normal execution or rollback execution (This may or may not be apparent to you when you dig into the details of the next section.

Figure 15C:
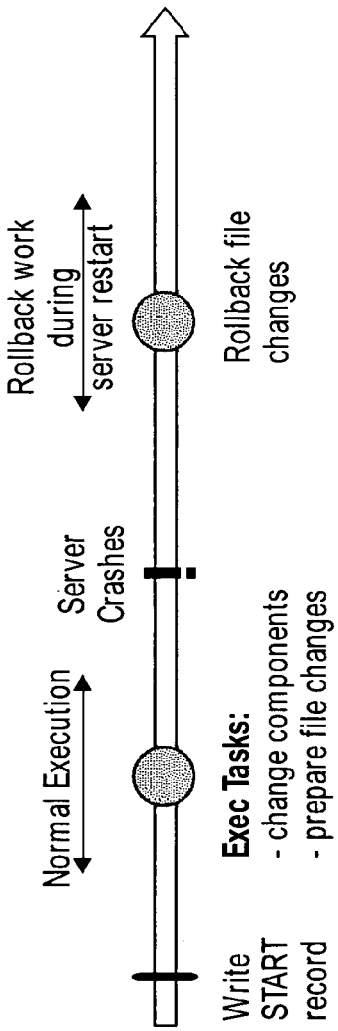
FIG. 15c illustrates failure of an update due to an server crash.

FIG. 15c illustrates execution failure due to a crash and recovery starts after restart. After a crash the changes to the persisted data (e.g., files) need to be recovered. In one embodiment, this can be accomplished by the system as follows:

1) Determine whether the last update was successful or not, using the LAST_TRANSACTION_INFO file.

2) If the last update failed or was in flight (LAST_TRANSACTION_INFO contains FAILED or START) then we need to rollback file updates as outlined in the previous section. Basically we search for any files named "X.new" and delete them, and rename all files named "X.old" to "X".

3) If the last update was successful we may still need to do some work. It is possible that the updates failed after writing the "SUCCESS" record, while still committing the file updates. Thus we simply search for any files name "X.old" and delete them, and rename all files name "X.new" to "X". This is kind of like a "Redo" operation.

4) Once all the files are recovered simply remove the LAST_TRANSACTION_INFO file (or put some empty string in it).

This mechanism allows the system to recover files even if it crashes many times during recovery.

In one embodiment, service bus segment recovery is handled in the following way:

1) During startup the service bus segment performs local recovery as mentioned in the previous section.

2) Then it contacts an admin server and sends a digest information about the configuration data it knows about. This digest contains the ids of all the components it knows about and their version numbers.

3) Admin server compares this digest with the configuration it has and determines what components service bus segment is missing, has out-of-date, or simply should not have. Then the admin server prepares and update plan just for that service bus segment which, when executed, can bring the service bus segment up-to-date with respect to the main configuration on the admin server.

In one embodiment and by way of illustration, executing operations in a loosely federated system requires two phase commit (2PC):

1) Each participant (resource manager) prepares the operations, but does not yet commit. If the prepare succeeds it sends OK message to the 2PC coordinator.

2) If 2PC coordinator gets OK from all participants it sends a commit signal. Otherwise it sends a cancel (rollback) signal.

3) Each participant gets the decision from the coordinator. Whether to commit the prepared changes, or roll them back.

Although a diagram may depict components as logically separate, such depiction is merely for illustrative purposes. It can be apparent to those skilled in the art that the components portrayed can be combined or divided into separate software, firmware and/or hardware components. Furthermore, it can also be apparent to those skilled in the art that such components, regardless of how they are combined or divided, can execute on the same computing device or can be distributed among different computing devices connected by one or more networks or other suitable communication means.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical discs, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for configuring a service proxy, comprising:
configuring a first transformation mapping between a reception protocol and a transmission protocol, wherein the first transformation mapping defines how context variables and transport-specific details within messages that are received with the reception protocol are to be modified, to conform those messages with requirements of the transmission protocol;
configuring a message processing path for processing a message that has been received with the reception protocol, and providing the message for transmission to the transmission protocol;
configuring a policy associated with a service proxy, wherein the policy defines one or more quality of service or other parameters associated with the service proxy;
wherein the message processing path includes a message processing node capable of processing the message; and
wherein the message processing node implements one of an interface or protocol that is compatible with the service proxy.

2. The method of claim 1, further comprising configuring a second transformation mapping between a reception message format and a transmission message format.

3. The method of claim 1, further comprising configuring a security scheme or authentication.

4. The method of claim 1, wherein the service proxy is capable of accepting the message from one of a client or another service proxy.

5. The method of claim 1, wherein the service proxy is capable of providing the message to one of a service or another service proxy.

6. The method of claim 1, further comprising configuring one or more stages in a message processing node wherein the configuring of the one or more stages can include adding or removing a stage.

7. The method of claim 1, wherein configuring the message processing path includes adding or removing one or more of the message processing nodes.

8. The method of claim 1, wherein configuration of the service proxy is dynamic.

9. A system for configuring a service proxy, comprising:
a configuration component capable of:
configuring a first transformation mapping between a reception protocol and a transmission protocol, wherein the first transformation mapping defines how context variables and transport-specific details within messages that are received with the reception protocol are to be modified, to conform those messages with requirements of the transmission protocol
configuring a message processing path for processing a message that has been received with the reception protocol, and providing the message for transmission to the transmission protocol;
configuring a policy associated with a service proxy, wherein the policy defines one or more quality of service or other parameters associated with the service proxy;
wherein the message processing path includes a message processing node capable of processing the message; and
wherein the message processing node implements one of an interface or protocol that is compatible with the service proxy.

10. The system of claim 9, further comprising configuring a second transformation mapping between a reception message format and a transmission message format.

11. The system of claim 9, further comprising configuring a security scheme or authentication.

12. The system of claim 9, wherein the service proxy is capable of accepting the message from one of a client or another service proxy.

13. The system of claim 9, wherein the service proxy is capable of providing the message to one of a service or another service proxy.

14. The system of claim 9, further comprising configuring one or more stages in a message processing node wherein the configuring of the one or more stages can include adding or removing a stage.

15. The system of claim 9, wherein configuring the message processing path includes adding or removing one or more of the message processing nodes.

16. The system of claim 9, wherein configuration of the service proxy is dynamic.

17. A computer readable medium having instructions stored thereon which when executed by a processor cause the computer to perform:
configuring a first transformation mapping between a reception protocol and a transmission protocol, wherein the first transformation mapping defines how context variables and transport-specific details within messages that are received with the reception protocol are to be modified, to conform those messages with requirements of the transmission protocol
configuring a message processing path for processing a message that has been received with the reception protocol, and providing the message for transmission to the transmission protocol;
configuring a policy associated with a service proxy, wherein the policy defines one or more quality of service or other parameters associated with the service proxy;
wherein the message processing path includes a message processing node capable of processing the message;
wherein the message processing node implements one of an interface or protocol that is compatible with the service proxy.

* * * * *

UNITED STATES PATENT AND TRADEMARK OFFICE
CERTIFICATE OF CORRECTION

| | | |
|---|---|---|
| PATENT NO. | : 7,653,008 B2 | Page 1 of 2 |
| APPLICATION NO. | : 11/221261 | |
| DATED | : June 26, 2010 | |
| INVENTOR(S) | : Paul B. Patrick et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

On the Title page, in Item (60), in column 1, under "Related U.S. Application Data", line 4, delete "21, 2005," and insert -- 21, 2004, --, therefor.

On the Title page, in Item (60), in column 1, under "Related U.S. Application Data", line 5, delete "May 21, 2005." and insert -- May 21, 2004. --, therefor.

On Drawing sheet 3 of 16, in Figure 2, line 2, delete "Propogation" and insert -- Propagation --, therefor.

On Drawing sheet 6 of 16, in Figure 5, line 1, delete "Consule" and insert -- Console --, therefor.

In column 2, line 40, delete "ARCHETECTURE" and insert -- ARCHITECTURE --, therefor.

In column 2, line 45, delete "ARCHETECTURE" and insert -- ARCHITECTURE --, therefor.

In column 3, line 51, delete "node," and insert -- node. --, therefor.

In column 6, line 6, delete "external" and insert -- eXternal --, therefor.

In column 6, line 46, delete "staffs" and insert -- starts --, therefor.

In column 18, line 39, delete "identityes," and insert -- identities, --, therefor.

In column 21, line 15, after "credential" insert -- . --.

Signed and Sealed this

Nineteenth Day of October, 2010

David J. Kappos
*Director of the United States Patent and Trademark Office*

CERTIFICATE OF CORRECTION (continued)
U.S. Pat. No. 7,653,008 B2

In column 24, line 58, delete "identityes" and insert -- identities --, therefor.

In column 32, line 53, after "can" insert -- be --.

In column 33, line 55, before "core" delete "with the"

In column 35, line 33, after "data" insert -- . --.

In column 36, line 56, after "require a" delete "the".

In column 36, line 60, before "server" delete "the".

In column 44, line 3, in claim 9, after "protocol" insert -- ; --.

In column 44, line 45, in claim 17, after "protocol" insert -- ; --.